US008922430B2

(12) United States Patent
Gander et al.

(10) Patent No.: US 8,922,430 B2
(45) Date of Patent: Dec. 30, 2014

(54) OPTIMIZATION OF VARIABLE COHERENCE INTEGRATION FOR THE LOCATION OF WEAK SIGNALS

(75) Inventors: Edward J. Gander, Morton, PA (US); Rashidus S. Mia, Phoenixville, PA (US)

(73) Assignee: TruePosition, Inc., Berwyn, PA (US)

( * ) Notice: Subject to any disclaimer, the term of this patent is extended or adjusted under 35 U.S.C. 154(b) by 462 days.

(21) Appl. No.: 13/334,727

(22) Filed: Dec. 22, 2011

(65) Prior Publication Data

US 2013/0162480 A1 Jun. 27, 2013

(51) Int. Cl.
*G01S 1/24* (2006.01)
*G01S 5/04* (2006.01)

(52) U.S. Cl.
USPC .......................................... 342/387; 342/442

(58) Field of Classification Search
CPC .............. G01S 3/46; G01S 3/48; G01S 5/06; H04B 7/1855
USPC ............ 342/173, 357.78, 387, 442, 451, 457; 455/456.1, 456.6; 340/515
See application file for complete search history.

(56) References Cited

U.S. PATENT DOCUMENTS

| | | | |
|---|---|---|---|
| 5,327,144 A | 7/1994 | Stilp et al. | |
| 5,608,410 A | 3/1997 | Stilp et al. | |
| 6,047,192 A | 4/2000 | Maloney et al. | |
| 6,108,555 A | 8/2000 | Maloney et al. | |
| 6,184,829 B1 | 2/2001 | Stilp | |
| 6,266,013 B1 | 7/2001 | Stilp et al. | |
| 6,346,911 B1 | 2/2002 | King | |
| 6,483,460 B2 | 11/2002 | Stilp et al. | |
| 6,532,251 B1 | 3/2003 | King et al. | |
| 6,661,379 B2 | 12/2003 | Stilp et al. | |
| 6,765,531 B2 | 7/2004 | Anderson | |
| 6,782,264 B2 | 8/2004 | Anderson | |
| 6,850,557 B1 | 2/2005 | Gronemeyer | |
| 6,876,859 B2 | 4/2005 | Anderson et al. | |
| 6,934,322 B2 | 8/2005 | King et al. | |
| 6,952,440 B1 | 10/2005 | Underbrink | |
| 7,167,713 B2 | 1/2007 | Anderson | |
| 7,340,259 B2 | 3/2008 | Maloney et al. | |
| 7,567,636 B2 | 7/2009 | Abraham et al. | |
| 7,783,299 B2 | 8/2010 | Anderson et al. | |
| 7,924,224 B2 | 4/2011 | LeFever et al. | |
| 8,005,174 B2 | 8/2011 | Abraham et al. | |
| 8,050,691 B2 | 11/2011 | Kangas | |
| 8,411,726 B2 | 4/2013 | Abraham et al. | |

(Continued)

FOREIGN PATENT DOCUMENTS

WO    WO 2007/017421    2/2007

OTHER PUBLICATIONS

U.S. Appl. No. 11/150,414, filed Jun. 10, 2005, Anderson.
U.S. Appl. No. 11/953,585, filed Dec. 10, 2007, LeFever.

(Continued)

*Primary Examiner* — Dao Phan
(74) *Attorney, Agent, or Firm* — Baker & Hostetler LLP

(57) ABSTRACT

In a network-based Wireless Location System (WLS), geographically distributed Location Measurement Units (LMUs) must be able to detect and use reverse channel (mobile to network) signals across multiple BTS coverage areas. By using Matched Replica correlation processing with the local and reference signals subdivided into discrete segments prior to correlation, the effects of mobile clock drift and Doppler shifts can be mitigated allowing for increased processing gain. By using historical network and real-time data about the radio signal and/or radio channel, the segmentation and computation scheme may be optimized to reduce latency and enhance capacity while maximizing location accuracy.

42 Claims, 12 Drawing Sheets

(56) References Cited

U.S. PATENT DOCUMENTS

| | | | |
|---|---|---|---|
| 2002/0186167 | A1 | 12/2002 | Anderson |
| 2003/0091103 | A1 | 5/2003 | Sendonaris |
| 2006/0003775 | A1 | 1/2006 | Bull et al. |
| 2007/0189181 | A1 | 8/2007 | Kirk et al. |
| 2008/0045260 | A1 | 2/2008 | Muharemovic et al. |
| 2008/0133126 | A1 | 6/2008 | Dupray |
| 2008/0180318 | A1 | 7/2008 | Glennon et al. |
| 2010/0039326 | A1 | 2/2010 | Lefever et al. |
| 2010/0124934 | A1 | 5/2010 | Mach |

OTHER PUBLICATIONS $3^{rd}$ Generation Partnership Project (3GPP), TS 25.201, V10.0.0, "Physical layer on the radio path; General description", Mar. 2011, 15 pages.

$3^{rd}$ Generation Partnership Project (3GPP), TS 25.211, V10.0.0, "Physical channels and mapping of transport channels onto physical channels (FDD)", Sep. 2010, 58 pages.

$3^{rd}$ Generation Partnership Project (3GPP), TS 25.213, V10.0.0, "Spreading and modulation (FDD)", Sep. 2010, 39 pages.

$3^{rd}$ Generation Partnership Project (3GPP), TS 25.420, V10.0.0, "UTRAN Iur Interface: General Aspects and Principles", Mar. 2011, 24 pages.

$3^{rd}$ Generation Partnership Project (3GPP), TS 25.430, V10.0.0, "UTRAN Iub Interface: General Aspects and Principles", Mar. 2011, 26 pages.

$3^{rd}$ Generation Partnership Project (3GPP), TS 25.450, V10.0.0, "UTRAN Iupc Interface: General Aspects and Principles", Mar. 2011, 12 pages.

$3^{rd}$ Generation Partnership Project (3GPP), TS 45.001, V10.0.0, "Physical layer on the radio path; General description", Mar. 2011, 44 pages.

3GPP2, "IP Based Location Services," Apr. 2003, 20 pages.

3GPP2, "Position Determination Service for cdma2000 Spread Spectrum Systems," Mar. 2004, 298 pages.

3GPP2, TIA/EIA-41-D Location Services Enhancements, Mar. 2004, 234 pages.

3GPP2, "Wireless Intelligent Network Support for Location Based Services," Jun. 2004, 151 pages.

PCT/US2009/053178—ISR and Written Opinion, Sep. 24, 2009, 7 pages.

OPTIMIZATION OF VARIABLE COHERENCE INTEGRATION FOR THE LOCATION OF WEAK SIGNALS

TECHNICAL FIELD

The subject matter described herein relates generally to methods and apparatus for locating wireless devices. More particularly, but not exclusively, the subject matter described herein relates to the use of historical and real-time radio environment information to optimize the use of advanced algorithms including matched replica and partial coherence processing to detect weak signals or signals disguised by the presence of noise allowing network-based wireless location systems increased capability to find the time-difference-of-arrival at multiple, geographically distributed receivers, increasing the location yield and accuracy while reducing latency and enhancing location capacity.

BACKGROUND

This application is related in subject matter to U.S. Pat. No. 7,924,224, "Variable Coherence Integration for the Location of Weak Signals," Apr. 12, 2011, the entirety of which is incorporated by reference.

Early work relating to network-based Wireless Location Systems is described in U.S. Pat. No. 5,327,144, Jul. 5, 1994, "Cellular Telephone Location System," which discloses a system for locating cellular telephones using time difference of arrival (TDOA) techniques. Further enhancements of the system disclosed in the '144 patent are disclosed in U.S. Pat. No. 5,608,410, Mar. 4, 1997, "System for Locating a Source of Bursty Transmissions." Both of these patents are assigned to TruePosition, Inc., the assignee of the present invention. TruePosition has continued to develop significant enhancements to the original inventive concepts. Enhancements to correlation processing for location, also called Matched-replica processing, is further described in U.S. Pat. No. 6,047,192, Apr. 4, 2000, "Robust, Efficient Localization System".

Over the past few years, the cellular industry has increased the number of air interface protocols available for use by wireless telephones, increased the number of frequency bands in which wireless or mobile telephones may operate, and expanded the number of terms that refer or relate to mobile telephones to include "personal communications services," "wireless," and others. The air interface protocols now used in the wireless industry include AMPS, N-AMPS, TDMA, CDMA, GSM, TACS, ESMR, GPRS, EDGE, UMTS WCDMA, WiMAX, LTE/SAE/eUTRAN and others.

As radio power levels decrease with increasingly strict power control schemes and with the introduction of advanced spread spectrum coding schemes (CDMA, W-CDMA, OFDM, SC-CDMA, etc.) that require continuous efficient power control, the ability of a wireless location system to detect radio signals at neighboring and geographically proximate receivers is reduced. Location techniques used by the wireless location system can include: Time-difference-of-arrival (TDOA), Angle-of-Arrival (AoA), hybrid TDOA/AoA and hybrid terrestrial TDOA with Global Navigation Satellite System (GNSS) measurements. A current example of a GNSS system is the United States NavStar Global Positioning System (GPS).

SUMMARY

Matched Replica correlation processing over a longer time period allows for radio signal detection at lower signal-to-noise ratios (SNRs). As suggested by the Cramer-Rao bound theorem, longer integration lengths can be used to increase the accuracy of time difference of arrival (TDOA) and Angle of Arrival (AoA) based wireless location systems Use of parallel processing in the correlation processing stage allows for the maximization of coherence for a matched replica signal sample. However, additional parallel computations add to processing load and system latency.

The system described herein uses historical and real-time data to set the number for parallel correlation processing paths and sample segmentation to reduce latency and enhance location capacity. For example, in one illustrative embodiment, an inventive method may be employed to generate a variable coherence scheme for use in a variable coherence integration process employing partial coherence processing paths to determine a precise time of arrival (TOA) of a transmission of a wireless device. The inventive method comprises, prior to entering the variable coherence integration process and in response to receiving tasking information, using historical information and real-time information to generate a variable coherence processing scheme, including determining a number of partial coherence processing paths and discrete subdivisions most likely to generate a highest processing gain. The variable coherence integration process is then entered. Moreover, in another illustrative embodiment, a wireless location system (WLS) comprises a subsystem for generating a variable coherence scheme for use in a variable coherence integration process, and a plurality of location measuring units (LMUs), wherein at least one LMU comprises means for carrying out the variable coherence integration process.

For example, as described in the above-cited U.S. Pat. No. 7,924,224, "Variable Coherence Integration for the Location of Weak Signals," Apr. 12, 2011, the variable coherence integration process may comprise: receiving a transmission of a wireless device; generating a first digital sample set representing discrete samples of the transmission over a collection duration; providing to first and second partial coherence processing paths copies of a reference and copies of the first digital sample set, wherein the copies are divided into m1 and m2 discrete subdivisions, wherein m1 and m2 are integers greater than 1 and m2 is greater than m1; executing, in the first partial coherence processing path, a first correlation process in which a first set of sample segments is correlated with said reference, said first set of sample segments comprising a first plurality (m1) of segments, each of the m1 segments comprising a subset of said first digital sample set, wherein the execution of said first correlation process yields m1 outputs, wherein the m1 outputs comprise m1 complex numbers; non-coherently summing the m1 outputs of the first correlation process to produce a number representing the sum of the magnitudes of the m1 complex numbers; executing, in the second partial coherence processing path, a second correlation process in which a second set of sample segments is correlated with said reference, said second set of sample segments comprising a second plurality (m2) of segments, each of the m2 segments comprising a subset of said first digital sample set, wherein the execution of said second correlation process yields m2 outputs, wherein the m2 outputs comprise m2 complex numbers; non-coherently summing the m2 outputs of the second correlation process to produce a number representing the sum of the magnitudes of the m2 complex numbers; searching outputs of the correlation processes to identify a peak corresponding to an earliest arriving signal in each output set; selecting one of said earliest arriving signals to determine a time of arrival (TOA) value for use in location processing, wherein the selecting is based on the peaks in the outputs of the correlation processes; and using the TOA value in location processing to determine a precise geographic location of said wireless device.

Additional aspects of illustrative embodiments of the present invention are described below.

BRIEF DESCRIPTION OF THE DRAWINGS

The foregoing summary as well as the following detailed description is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1A:
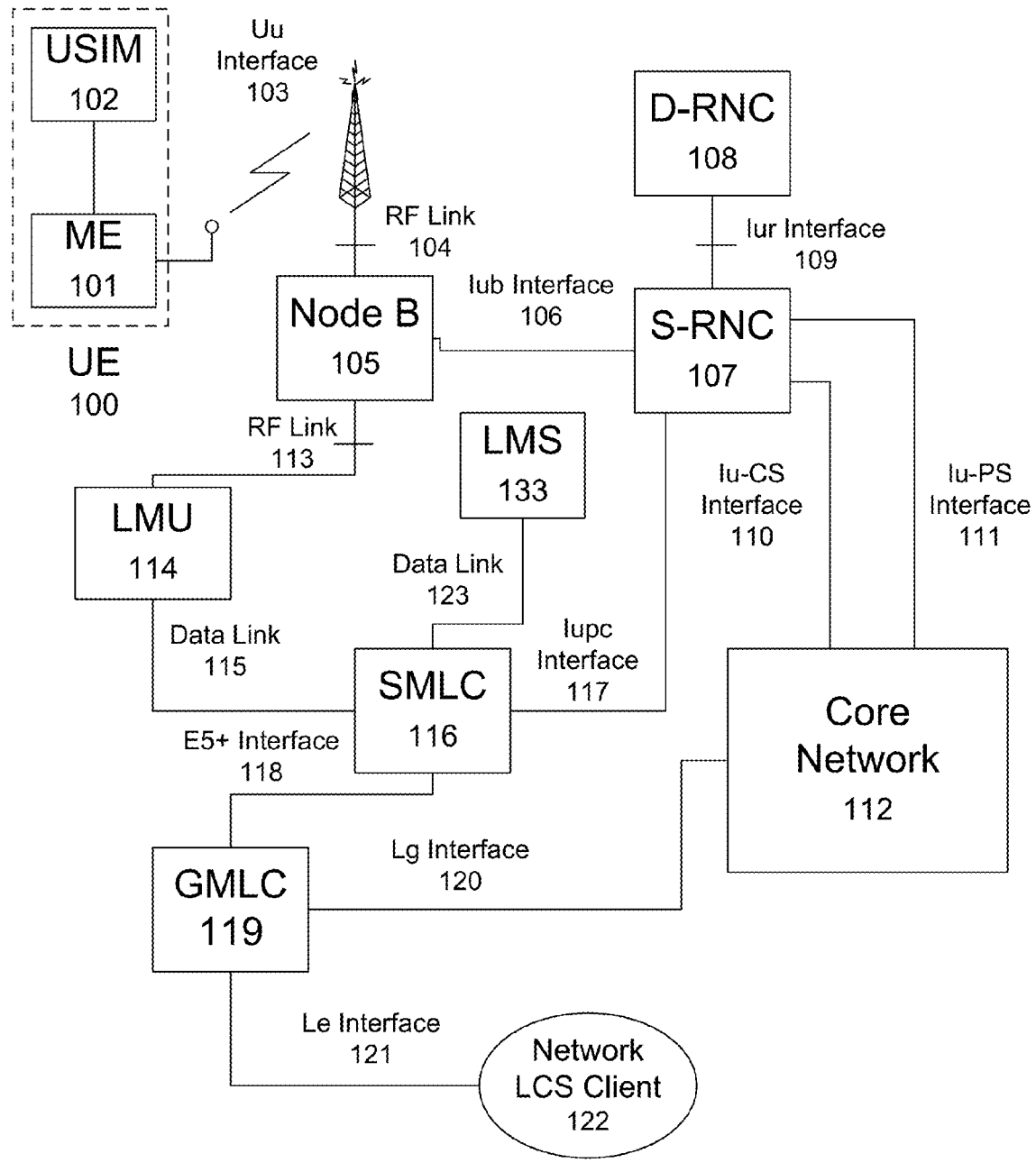
FIG. 1A schematically depicts a Wireless Location System for use with a UMTS (Wideband CDMA radio) based wireless communications system.

We will now describe illustrative embodiments of the present invention. First, we provide a detailed overview of the problem and then a more detailed description of our solutions.

Received signal coherence over the entire integration length cannot normally be assumed due to mobile multi-path interference, oscillator drift and Doppler shifts. By creating using historical or real-time information on the radio channel, a scheme can be devised to maximize the signal coherence while at the same time, reducing processing load. The primary factor in prediction of a coherent sample size is movement by the mobile device and the resulting Doppler shift.

The velocity of the mobile device relative to the location of the receiver has an effect on the received frequency. While Doppler shifts which can be factored out using the multiple receivers of a network-based TDOA wireless network in FDOA processing, the effect of velocity changes on the coherence of the received signal at a single site is magnified as the uplink signal frequency increases.

max Doppler=UEvelocity*CarrierFrequency/(speed-of-light-in-air).

A schema, a set of processing paths is created to maximize coherence. By setting a number of concurrent processing paths each with a different sample segmentation size, a set of maps can be produced. The "map" refers to the three-dimensional [range(x), Doppler(y),correlation(z)] surface that is produced for each path in the schema. The "map" is the output of each of the paths.

The resulting Doppler resolution in each of the maps is a function of the coherent correlation length. The longer the coherent correlation, the higher the Doppler resolution, and thus one obtains more samples in the Doppler direction of the map. For shorter coherent correlations, one obtains less Doppler resolution, and thus fewer or less samples in the Doppler direction of the map.

Detailed Description of Improved Signal Detection in a WLS

The uplink time difference of arrival (U-TDOA) location method, at its most basic level, relies on the assumption that a direct line of sight (LOS) path with sufficient signal energy exists between the transmitter and the receiver stations. An uriobstructed LOS path does not necessarily need to exist between the transmitter and the receiver; however, it is assumed that the signals do not undergo a change in direction due to reflections, diffraction, ducting, etc. This assumption is made in order to convert the time difference of arrival into the spatial straight-line distance from the mobile station to the primary and cooperator receivers. These receivers, called Location Measurement Units (LMUs) by the 3GPP, are geographically distributed. In an overlay-deployment, LMUs are typically co-located with the wireless network provider's base stations (BS) (or base transceiver stations, BTS, where these are used interchangeably) so that the BS and LMU may share environmentally controlled space, power, and antenna access. In an integrated deployment, the LMU is incorporated into the Access Point (AP), Base station (BS), Node B, or Base Transceiver Station (BTS) circuitry.

In reserved wireless communications bands, which currently include the 700/850/1900 MHz (North American) and the 900/1800/2100 MHz (European) Cellular, GSM, PCS, DCS, AWS and UMTS frequency bands, aggressive power control to increase the capacity of the wireless network and increasing use of spread spectrum radio signaling (such as CDMA, W-CDMA, OFDM, and TD-SCDMA) serve to lower the power available to the geographically distributed network of receivers The present invention also functions in unlicensed or shared bands in areas served by the geographically distributed network of software defined wideband (or banked narrowband) receivers.

As originally disclosed in U.S. Pat. No. 5,327,144, "Cellular Telephone Location System", Stilp et al, the signal of the emitter to be located, i.e. the mobile device, is collected by a cluster of geographically dispersed specialized receivers (Location Measurement Units or LMUs, formerly called Signal Collection Systems or SCS's). The Wireless Location system (WLS), when triggered by a radio monitoring sensor, a link-monitoring system, or by a request from the wireless operator, first performs radio signal metrics collection and determination of best LMU and a set of cooperating LMUs. Each LMU preferably uses a wideband receiver to collect and digitize RF for a sample period. The best (as determined by signal strength and/or quality) LMU is normally associated with the serving cell antenna whereas the cooperating LMUs are nominally those in close geographic proximity to the best/serving LMU with acceptable SNR and/or Eb/No and that do not create large geometric-dilution-of-precision (GDOP). Implementation of the LMU as a bank of narrowband receivers (narrowband in the sense that the individual receiver's bandwidth approximates a single channel) is also possible as detailed in U.S. Pat. No. 6,184,829 "Calibration for Wireless Location System". While the examples given for the present invention relate to a distributed 'station-based' approach where the reference signal is distributed to other candidate LMUs and the signal processing is performed at the receiving LMU, sufficient, low latency, bandwidth between the LMU(s) and a central processing site of computers would enable signal processing to be performed centrally.

Digital signal processing software within the LMU models a radio receiver and demodulates the signal of interest conventionally. This demodulated 'perfect' reference signal is sent from the reference LMU to a group of cooperator LMUs selected on the basis of the radio metric collection. Each cooperator LMU re-modulates the reference and uses this in a correlation process to determine the time of arrival (TOA) of the signal of interest at the best/serving LMU.

In a preferred implementation, copies of the re-modulated ideal reference and the locally recorded received signal are subdivided in time and then the corresponding (in time) subdivisions are correlated, effectively creating 1-to-NPath processing paths (where NPath is an integer greater than 1). For each processing path, the correlation of each individual subdivision can be expressed mathematically via the following:
Rs=Correlation function per subdivision "s"

$$Rs(r, d) = \sum_{q=1}^{P} g(r)e^{-j\omega d} * l(r - q)$$

Where:
g=reference signal
l=Local signal
N=number of samples in sample collection duration
M=Number of subdivisions
p=N/M (number of samples in each subdivision)
s=segment index (goes from 1 to M)
r=range
d=Doppler and drift
Once the correlation for each subdivision(s) is performed, then the magnitude of the correlation for each subdivision is determined and the sum of correlations for each processing path (NPath) is calculated. Mathematically, this operation can be shown as:

$$R(r, d) = \sum_{s=1}^{M} Rs(r, d)$$

Coherent Case

Figure 3:
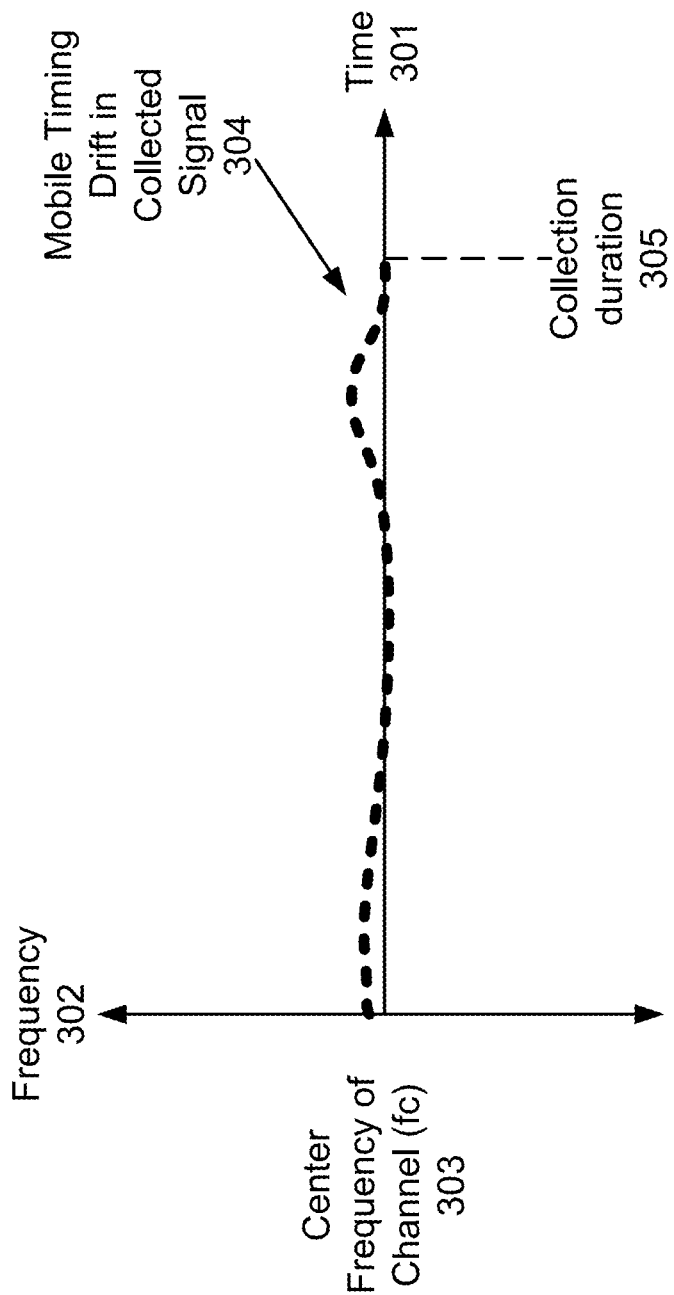
FIG. 3 depicts the frequency shifts due to mobile velocity, mobile clock drift and multi-path reception of the mobile's uplink signal.

For example, FIG. 3 shows a signal data segment with a length of 1000 samples over the collection duration. If the mobile was stationary (and thus no Doppler shift) and experienced no internal clock drift, then performing a coherent correlation provides a processing gain of 10 log(1000)=30 dB. This 30 dB gain is relative to that of a single sample.

However, this gain can only be achieved if the correlation of signals really is coherent over the full 1000 samples. If it is not, the signal correlation simply falls apart and can provide 0, or even negative processing gain.

A Non-Coherent Case

Use of the variable coherence technique can decrease the matched replica processing susceptibility to non-coherence caused by frequency drifts between the reference signal and the collected signal. The processing gain from coherent correlation is 10 log(K), where K is the ratio by which you are increasing the data length. A common approach is to let the reference be a single sample, then K is simply the number of samples over which you are performing the correlation.

Variable coherent correlation involves segmenting copies of the reference and local signals, the doing complex multiplies between the reference and local signals and then summing the produced correlation products with a complex summation. The term variable is used since the number of subdivisions and/or parallel processing paths (NPath) can be adjusted depending on test results for the network topology used and the geographic area covered. The use of the variable coherence technique can also be toggled depending on sample collection duration, with shorter durations using only the full coherence case.

As an example, the collected signal is segmented into discrete, successive subdivisions. Using the same reference signal and collected signal duration, each with 1000 total samples over the same time period, the correlated signal can be broken up into 10 consecutive, discrete subdivisions of 100 samples each.

Assuming coherence over each subdivision duration (each of the 100 sample segments), the processing gain is 10 log (100)=20 dB.

The 10 segments can then be non-coherently summed (or take the magnitude square of each segment and then add the magnitudes together, rather than complex summation). The processing gain from the non-coherent summation is 10 log (sqrt(P)), where P is the number of segments that are summed up non-coherently. So, for this example of 10 segments of a 100 samples each, assuming coherence over each subdivision 406, the non-coherent processing gain is 10 log(sqrt(10))=5 dB. The total variable coherence operation processing gain=25 dB=20 dB (from coherent correlation of 100 samples)+5 dB (from the non-coherent sum of the 10 segments).

By subdividing the signal up into 10 segments we only get 25 dB of processing gain compared to the 30 dB we would get for a fully coherent correlation. However, if the signal is not coherent, which is likely for long sample periods when the mobile may move (resulting in Doppler shifts) or the mobile timing reference drifts, the fully coherent case falls apart, and the variable coherence approach still yields 25 dB of processing gain.

However, since the coherence gain cannot be known a priori, multiple processing paths, each with a different number of processing paths (these paths may be parallel or serial dependent on the signal processing power and configuration available), are created for each location estimate.

The variable coherence technique can be recursive. If sufficient time is allowed by the quality of service parameters, the entry into variable coherence operation can use the result of a first variable coherence processing run to feed a second cycle. If, for instance, the correlation amplitude of correlation processing path with 'Ma' subdivisions is substantially higher than all other processing paths in a cycle, then a subsequent cycle with multiple processing paths with a distribution of subdivisions centered around 'Ma' such as 'Ma+/−x'" can be used in an attempt to optimize the total processing gain.

FIG. 1

Overlay WLS Environments

Figure 1B:
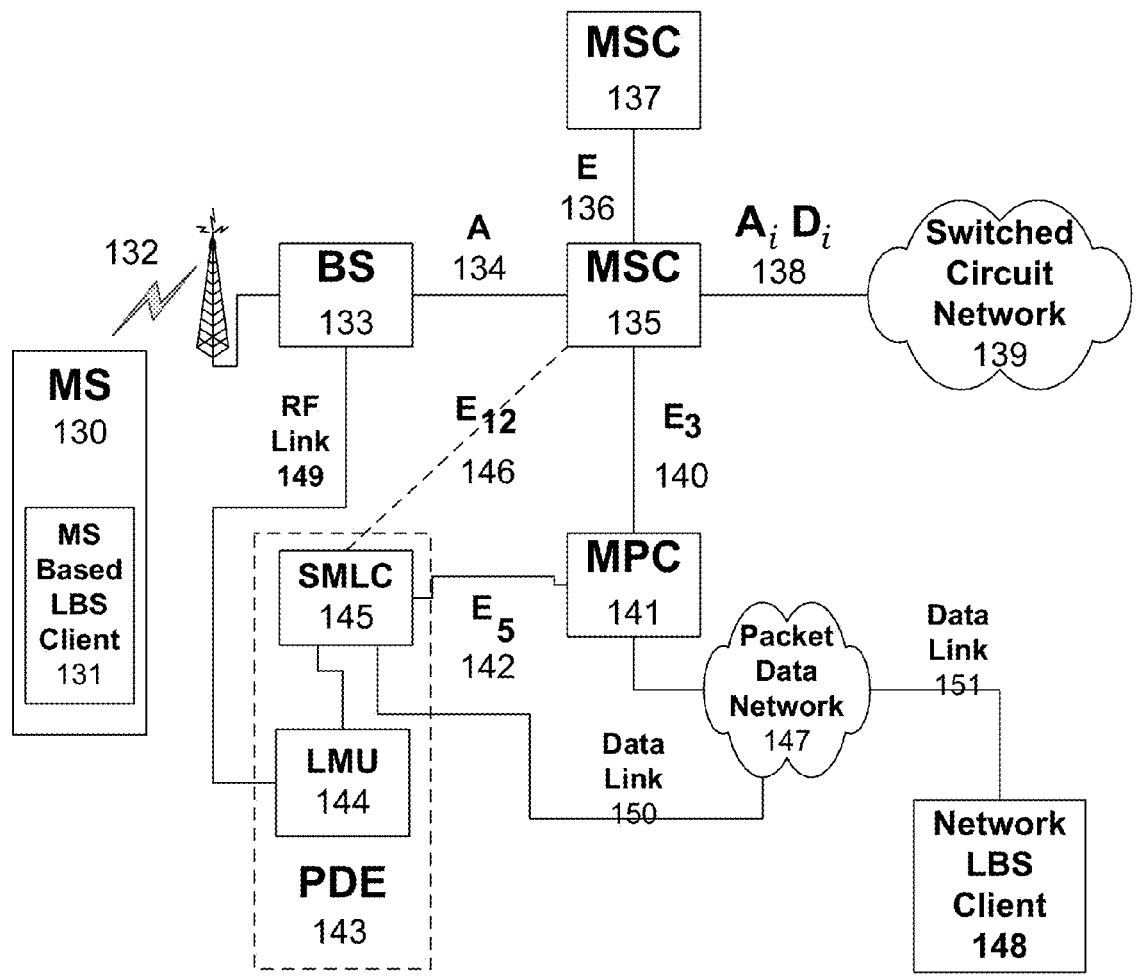
FIG. 1B schematically depicts a Wireless Location System for use with a CDMA based wireless communications system.

FIGS. 1A, 1B, and 1 are illustrative of the types of wireless communications networks that the present invention functions within. While the following subsections describe exemplary implementations of the communications system as a UMTS, IS-95 and CDMA2000 cellular communication systems, the teachings of the present invention are analogously also applicable to other wideband, spread spectrum packet radio communication systems that are implemented in other manners.

FIG. 1A

FIG. 1A shows the architecture of an illustrative UMTS network reference model for the present invention.

UE (100)

The UMTS UE (User Equipment) 100 is the logical combination of the ME (Mobile Equipment) 101 and SIM/USIM (Subscriber Identity Module/UMTS Subscriber Identity Module) 102. The UE is the formal name for the UMTS handset or mobile.

ME (101)

The Mobile Equipment (ME) 101 is the hardware element of a mobile station and comprises of keyboard, screen, radio, circuit boards and processors. The ME processors support both communications signal processing and processing of various UE-based services that may include a UE-based LCS Client application.

USIM (102)

The USIM (UMTS Subscriber Identity Module) 102, also referred to as a SIM card, is a programmable memory device what holds the user subscription information to the UMTS mobile network. The USIM contains relevant information that enables access onto the subscribed operator's network and to UE-based services that may include a UE-based LCS Client application.

Node B (105)

The Node B 105 is the function within the UMTS network that provides the physical radio link between the UE 100 (User Equipment) and the land-side network. Along with the transmission and reception of data across the radio interface the Node B also applies the codes that are necessary to describe channels in a W-CDMA system. The Node B supplies timing information to UEs 100 over the Uu 105 interface. The Node B access the Uu interface via wired antenna feeds 104.

The UTRAN (UMTS Terrestrial Radio Access Network) comprises one or more RNS (Radio Network Subsystem). Each RNS comprises one or more RNC 107 and their supported Node B's 105. Each RNS control the allocation and the release of specific radio resources to establish a connection between a UE 100 and the UTRAN. A RNS is responsible for the resources and transmission/reception in a group of cells.

S-RNC (107)

When a RNC 107 (Radio Network Controller) has a logical RRC (Radio Resource Control) connection with a UE (User Equipment) via the Node B 105, it is known as the S-RNC 107 for that UE 100. The S-RNC 107 is responsible for the user's mobility within the UTRAN network and is also the point of connection towards the CN (Core Network) 112. The S-RNC 107 connects to the Node B via the 3GPP standardized Iub interface 106.

D-RNC (108)

When a UE 100 (User Equipment) in the connected state is handed onto a cell associated with a different RNC it is said to have drifted. The RRC (Radio Resource Control) connection however still terminates with the S-RNC 107. In effect the D-RNC 108 acts as a switch, routing information between the S-RNC 107 and the UE 100.

C-RNC

The Controlling Radio Network Controller is the RNC (Radio Network Controller) responsible for the configuration of a Node B. A UE (User Equipment) accessing the system will send an access to a Node B, which in turn will forward this message onto its CRNC. The C-RNC is nominally the S-RNC.

Core Network (112)

The Core Network 112 provides the functions of mobility management, exchange services for call connection control signaling between the user equipment (UE) and external networks, and interworking functions between the UTRAN radio access network and external packet and switched circuit networks. The Core Network also provides billing functionality, security and access control management with external networks.

LMU (114)

The Location Measurement Unit (LMU) makes radio measurements to support positioning of UE. The LMU may be an overlay addition to the UMTS network or may be integrated into the hardware and software of the Node B. In a UMTS wireless communications network, the LMU receives the W-CDMA based Uu radio interface for development of TDOA and/or TDOA/AoA calculated location and velocity estimates. The LMU connects to cell site antenna or to the Node B via a radio coupler to the antenna feed 113.

Examples of a U-TDOA and U-TDOA/AOA LMU have been previously described in U.S. Pat. No. 6,184,829, "Calibration for a Wireless Location System"; U.S. Pat. No. 6,266, 013, "Architecture for a Signal Collection System in a Wireless Location System"; and U.S. Pat. No. 6,108,555, "Enhanced Time Difference Localization System", all owned by TruePosition and incorporated herein by reference.

SMLC (116)

The SMLC 116 is a logical functional entity implemented either a separate network element (or distributed cluster of elements) or integrated functionality in the RNC 107. The SMLC 116 contains the functionality required to support Location Based Services. The SMLC 113 is the logical entity that provides the bridge between the wireless network and the location network (LMU 114, SMLC 116, and GMLC 119) by possessing data concerning the geographical area as well as the radio network topology. The SMLC 116 manages the overall co-ordination and scheduling of LMU 114 resources required for the location of a mobile. It also calculates the final location, velocity, and altitude estimates and estimates the achieved accuracy for each. In the present invention, the SMLC 116 controls and interconnects a set of LMUs via packet data connections 115 for the purpose of obtaining radio interface measurements to locate or help locate UE 100 in the geographical area that its LMUs serve. The SMLC 116 contains U-TDOA, AoA and multipath mitigation algorithms for computing location, confidence interval, speed, altitude, and direction of travel. The SMLC 116 can also determine which wireless phones to locate based upon triggering from the Link Monitoring System (LMS) 124 or requests from the 3GPP standardized Iupc interface 117 to an infrastructure vendor's Radio Network Controller (RNC) Station Controller 107.

GMLC (119)

The Gateway Mobile Location Center (GMLC) 119 is defined by 3GPP standards as the clearinghouse for location records in a GSM/GPRS/UMTS network. The GMLC 119 serves as a buffer between the tightly controlled SS7 network (the GSM-MAP and CAP networks) and the unsecure packet data networks such as the Internet. Authentication, access control, accounting, and authorization functions for location-based services are commonly resident on or controlled by the GMLC 119. A Gateway Mobile Location Center (GMLC) is a server that contains the functionality required to support LBS services as well the interworking, access control, authentication, subscriber profiles, security, administration, and accounting/billing functions. The GMLC also has the ability to access the GSM-MAP and CAP networks to discover subscriber identity, request and receive routing information, obtain low-accuracy UE location, and to exert call control based on UE location. In any UMTS network, there may be multiple GMLCs.

Network LCS Client (122)

A Network LCS Client 112 is the logical functional entity that makes a request to the PLMN LCS server for the location information of one or more than one target UEs. In the UTMS network depicted in FIG. 1, the LCS server is implemented as software and data on the GMLC 119 platform. This inclusion of the LCS server with the GMLC 119 is typical for deployed systems. An LCS server comprises a number of location service components and bearers needed to serve the LCS clients. The LCS server shall provide a platform which will enable the support of location based services in parallel to other telecommunication services such as speech, data, messaging, other teleservices, user applications and supplementary services. The Network LCS client uses the Le interface 121 to access the GMLC. The network LCS client can communicate with the GMLC-based LCS server 119 to request the immediate, periodic or deferred location information for one or more target UEs within a specified set of location-related quality of service parameters if allowed by the security and privacy protections provided by the GMLC-based LCS server 119

Mobile LCS Client

The Mobile LCS Client is a software application residing in the ME 101 of the UE 100 using the USIM 102 for non-volatile or portable data storage. The mobile LCS Client may obtain location information via the GMLC 119 using the Le Interface 121 over a wireless data connection.

LMS

The LMS 133 provides passive monitoring of UMTS network interfaces such as the Iub, Iur, Iu-CS and Iu-PS by means of passive probes (not pictured) reporting to a central server or server cluster. By monitoring these interfaces, the LMS 133 may develop tasking and triggering information allowing the SMLC 116 to provide autonomous, low-latency location estimates for pre-provisioned LBS applications. LMS 133 developed triggering and tasking information is delivered to the SMLC 116 via a generic data connection 123, normally TCP/IP based. The LMS 133 is a modification to the Abis Monitoring System (AMS) described in U.S. Pat. No. 6,782,264, "Monitoring of Call Information in a Wireless Location System" and later expanded in U.S. patent application Ser. No. 11/150,414, "Advanced Triggers for Location Based Service Applications in a Wireless Location System," both incorporated herein by reference. The LMS 133 functionality may be incorporated as software into the Node B 105 or RNC 107, 108 nodes of the UMTS system or deployed as an overlay network of passive probes.

Interfaces

The Uu interface 103 is the UMTS Air Interface as defined by 3GPP. This radio interface between the UTRAN (UMTS Terrestrial Radio Access Network) and the UE (User Equipment) utilizes W-CDMA and either Frequency Division Duplexing (FDD) or Time Division Duplexing (TDD). The UNITS radio interface is well described in 3GPP technical specifications 25.201 and 45.201, both entitled; "Physical layer on the radio path; General description". Specifics of the Uu radio interface as implemented in an FDD W-CDMA radio system are described in 3GPP Technical Specification 25.213, "Spreading and modulation (FDD)". Details and descriptions of the physical and logical channels used in a FDD W-CDMA UMTS are located in 3GPP Technical Specification 25.211, "Physical channels and mapping of transport channels onto physical channels (FDD)".

The Iub interface 106 is located in a UMTS radio network and is found between the RNC (Radio Network Controller) 107 and the NodeB 105. The Iub interface is as defined in 3GPP TS 25.430, "UTRAN Iub Interface: general aspects and principles".

The Iur 109 interconnects the UMTS Server or core RNC 70 with the Drift RNC 108 in the UMTS network. The Iur interface is standardized in 3GPP Technical Specification 25.420, "UTRAN Iur Interface: General Aspects and Principles"

The Iu-CS (Circuit Switched) interface 110 connects the UMTS RNC 107 with the circuit switched communications oriented portion of the Core Network 112.

The Iu-PS (Packet Switched) interface 111 connects the UMTS RNC 107 with the packet switched communications oriented portion of the Core Network 112.

The Iupc 117 interconnects the UMTS RNC 70 with the SMLC (also called the SAS) in the UMTS network for location estimation generation. The Iupc interface is introduced in 3GPP Technical Specification 25.450, "UTRAN Iupc interface general aspects and principles".

The E5+ interface 118 is a modification of the E5 interface defined in the Joint ANSI/ETSI Standard 036 for North American E9-1-1. The E5+ interface 118 connects the SMLC 116 and GMLC 119 nodes directly, allowing for push operations when LMS 114 triggers are used by the wireless location system with either network acquired information (cell-ID, NMR, TA, etc.) or via TDOA and/or AoA (angle of arrival) performed by the LMU's 114 specialized receivers.

The Le interface 121 is an IP-based XML interface originally developed by the Location Interoperability Forum (LIF) and then later standardized by the 3rd Generation Partnership Program (3GPP) for GSM (GERAN) and UMTS (UTRAN). The Location-based services (LBS) client 122 is also known as a LCS (Location Services). The LBS and LCS services resident on the LCS Client 122 are software applications, data stores, and services uniquely enabled to use the location of a mobile device.

FIG. 1B

FIG. 1B schematically depicts a representative configuration of the major components of a wireless communications system based on that described in the ANSI/ETSI Joint Standard "J-STD-036", Enhanced Wireless 9-1-1 Phase 2. For the present invention, FIG. 2B is used to represent an implementation present invention within a TIA-EIA-95 (IS-95) based CDMA wireless communications system with standardized nodes and interfaces. Although originally created in support of emergency services (E911, E112), this functional network can also be used for commercial location services delivery in a mixed circuit switched, packet switched network where the MSC 135 and MPC 141 communicate with the ANSI-41 protocol using the link E3 140. The present invention resides within the Positioning Determining Equipment 143 node of the reference network.

MS

The CDMA Mobile Station (MS) 130 is a hardware software system allowing user access to the CDMA radio interface 132 and thus the complete wireless communications network and services.

The MS 130 may have a location based software application, the LBS Client 131 in residence. The MS-based LBS client uses the resources provided by the MS 130 to function.

The IS-95 Base Station comprises a BSC (Base Station Controller) and one or more BTS (Base Transceiver Station(s)). The BS 133 provides the functionality that enables a mobile to access network interfaces and services over the IS-95 CDMA air interface.

The BS 133 interfaces the CDMA radio interface 132 with land-based wireless communications system network. The BS 133 provides channel allocation to the MS 130, power control, frequency administration, and handover (soft, softer and hard) between other proximate BS.

The A interface 134, nominally an IS-634 compliant interface for TS-95 CDMA systems, interfaces the BS 133 to the MSC 135, carrying control messaging between the MSC 135 and BS 133 and DTAP (Direct Transfer Application Part) messaging from the MSC 135 intended for the MS 130.

The MSC (Mobile Switching Center) 135 provides the functions of mobility management, exchange services for call connection control signaling between the MS 130 and external switched circuit networks 147, and interworking functions between the CDMA radio access network and external packet switched networks. The MSC 135 also provides call routing and billing functionality. In some vendor implementations, the MSC 135 also provides interworking, routing, and transcoding services for digital packet communications.

The MSC 135 may connect with other MSC 137 using the ANSI-41 defined E interface 136.

MSC 135 connects to switched circuit networks 139 with control interfaces such as the ISDN User Part (ISUP) as standardized (Telcordia GR-154 and T1.113) as the Ai/Di 138 interfaces and trunks.

The J-STD-036 standardized E3 140 interface is used to connect the MSC 135 to the MPC 141. E3 is an ANSI-41 based interface that includes Wireless Intelligent Networking (WIN) capabilities for location.

The MPC (Mobile Position Center) 141 is the gateway between the mobile network, location networks, and network-based location applications. The MPC 141 acts as router and protocol converter between the E5 interface 142 specific TCAP over TCP/IP-based, J-STD-036 defined, Location Services Protocol, the E3 interface 140 ANSI-41 messaging and the TCP/IP based data link 151 to external LBS clients 148. The MPC may select among deployed PDE 143 based on quality of service parameters included in the E3 140 messaging.

The MPC connects to Position Determining Entities (PDE) 143 via the aforementioned E5 interface. In the present invention, the PDE 143 comprises a cluster of centralized processors, the serving Mobile Location Center (SMLC) 116 and a geographically distributed population of Location Measurement Units (LMU) 114 interconnected by a proprietary TCP/IP-based interface 115. The LMU 114 connects to the BSC 133 via either a radio frequency antenna feed 149 from the BS's 133 receive antennae or alternately a data link carrying a digitized representation of the received signal from each receive antennae of the BS 133.

Although not part of the J-STD-036 defined LBS network, the SMLC 116 may communicate directly with the Network LBS Client 148 and via data connection to the MS based LBS client 133 over a packet data connection link 150 to a generic Packet Data Network 147.

FIG. 1C

Figure 1C:
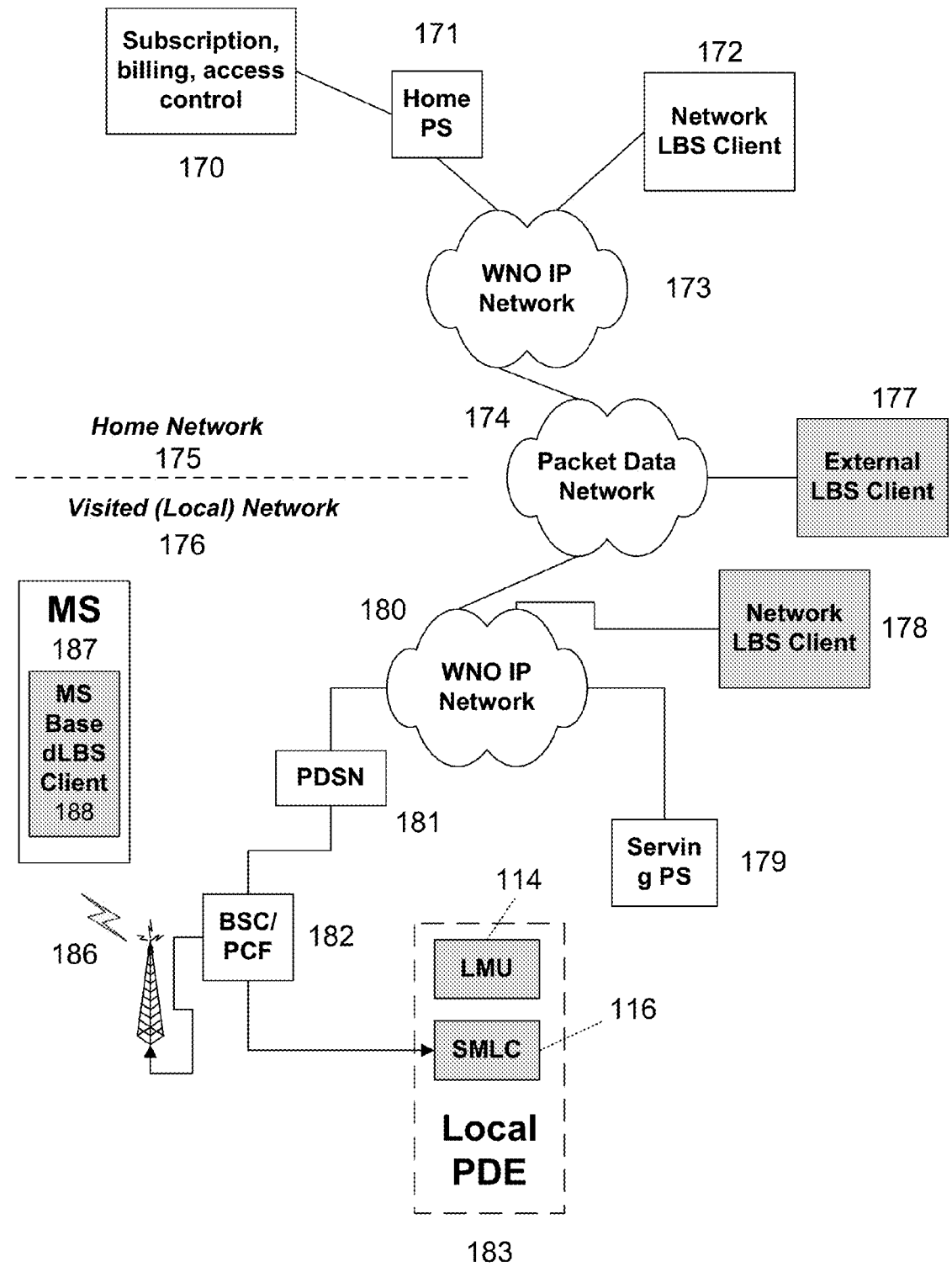
FIG. 1C schematically depicts a Wireless Location System for use with a CDMA all-IP based wireless communications system.

FIG. 1C schematically depicts a representative configuration of the major components of a wireless communications system and wireless location system based a packet-based transport network. In this figure, the wireless communications system is assumed to be based on the IS-2000 CDMA or CDMA200® system.

This packet-based (also known as the all-IP based) LBS network is described by 3GPP2 standards; TIA-1020, IP based location services (3GPP2 x.P0024); TIA-881, LS Authentication/Privacy/Security Enhancements (3GPP2 X.P0002); TIA-843, Wireless Intelligent Network LBS Phase III (3GPP2 X.P0009); and TIA-801, Position Determination Service for cdma2000®. The present invention would be implemented in the local PDE.

The all-IP wireless communication system depicted in FIG. 1C includes a home network 175 part and a visited network 176 part. In many cases the Visited Network 176 will be the Home network 175. The Home network 175 and Visited Network 176 are connected together by way of a packet data network 174 such as the public Internet. Each network part, Home 175 and Visited 176 comprises multiple functional entities interconnected by local Wireless Network Operator IP Networks 173, 180.

For the enabling of location based services, A Home Positioning Server (H-PS or just PS) 171 interconnects via packet-based connections with the administration node 170 which supplies subscription and user profile storage, LBS services administration and access control. For the delivery of LBS services the H-PS 171 may interconnect to a home network 175 based Network LBS Client 172, an external LBS client 177, a Visited Network 176 based LBS Client 178 or an MS-based LBS Client 188. For the obtaining of current or historical location of the MS 187, the H-PS 171 may interconnect via packet-based data connections to the. local PDE 183.

The H-PS 171 plays the same role as a Home network MPC in IS-41 network in respect to the roles of authentication, access control, administration, and accounting functions.

The Packet Data Serving Node (PDSN) 181 acts as the connection point between the radio access and Visited Network 176. This component is responsible for managing PPP sessions between the mobile provider's core IP network and the mobile station The S-PS or Serving Positioning Server 176 is a PS in a visited network. The Serving PS 176 provides position information of visiting MS to requesting entities such as the Home PS 171, Network LBS clients. It plays the same role as Serving MPC in IS-41 network and acts as the local proxy for the H-PS 171 in respect to the roles of authentication, access control, administration, and accounting functions.

The BSC/PCF 182 is the base station controller/packet control functional node. The BSC/PCF 182 node manages interconnections and communications between the radio network 186 and the PDSN. The BSC/PCF 182 is responsible for the transparent exchange of traffic and signaling messages between the MS 187 and network-based destinations.

The radio network 186 comprises the actual CDMA2000® air interface and the radio transmission facilities alternately called BS (base stations), BTS (Base station Transceiver Sites, AP (Access Points) and cells. The radio network 186 interconnects the BSC/PCF 182 with the MS 187 for packet data and packetized voice communications.

In the present invention, the local PDE 183 includes a server cluster based SMLC 116 and a geographically distributed population of LMU 114.

The PDE 183 interacts with the MS 187 (possibly using the PS's 171, 179 as proxies) to provide location services to the user via the MS-based LBS client 188 or to other LBS Clients 172, 177, 178 based on the mobile's location.

Other elements of the all-IP, packet architecture of the wireless communication system for reasons of simplicity, are not shown.

Figure 2A:
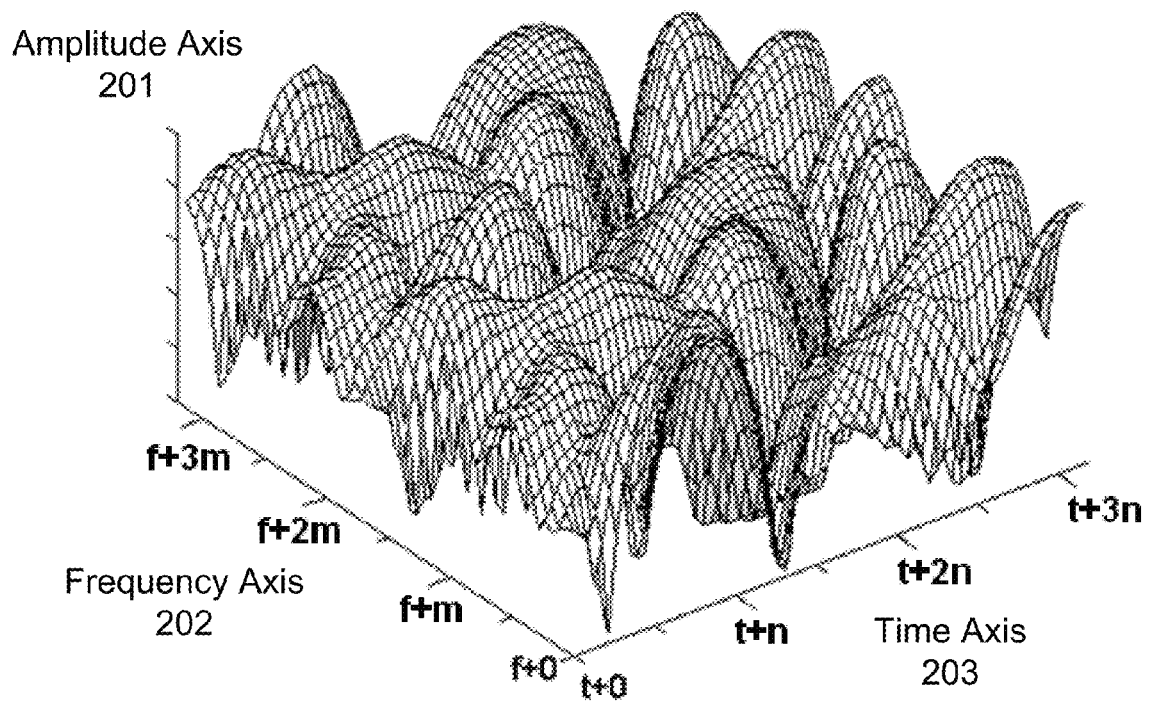
FIG. 2A depicts a representative time-frequency-correlation map of a received spread spectrum signal with multipath components.
Figure 2B:
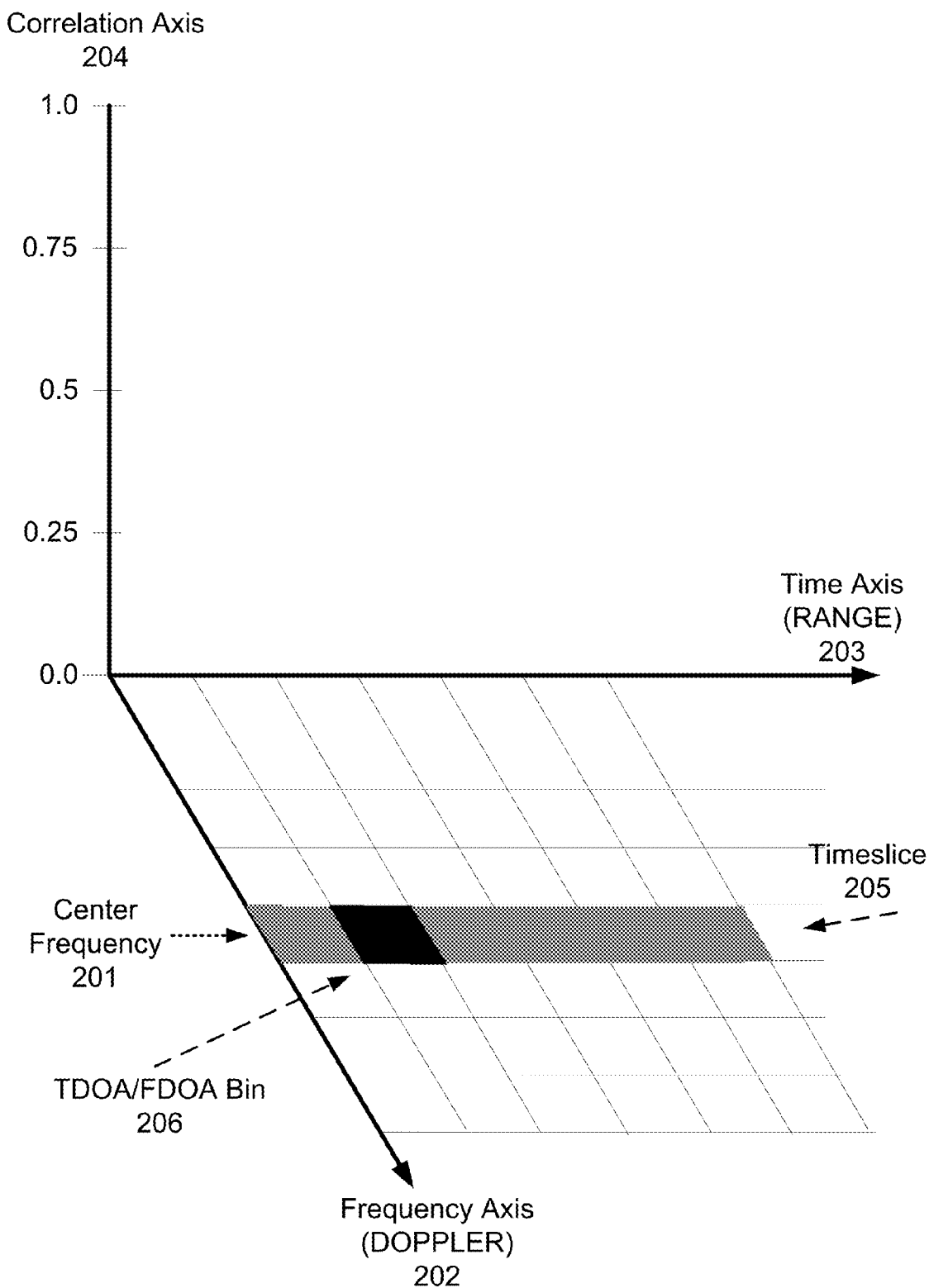
FIG. 2B depicts a representative time-frequency-correlation map with terminology.

FIGS. 2A and 2B

FIG. 2A depicts a noise and multi-corrupted radio communications signal. Frequency shifts due to velocity changes during transmission (Doppler) and reference clock drift cannot be determined a priori.

FIG. 2B depicts the time and frequency search space used to determine a maximum correlation with of the received and the reconstructed and re-modulated reference (replica) signal.

FIG. 3

FIG. 3 is shown to illustrate the difficulty of applying the matched replica correlation between a reconstructed reference signal and a locally collected signal corrupted by mobile frequency reference drift and Doppler shift. As shown in the time 301 versus frequency 302 plot, the mobile channel has an assigned center frequency (fc) 303, but due to mobile frequency reference drift and Doppler shifts caused by motion of the mobile device during the collection duration 305; the actual frequency of the collected signal drifts 304. This frequency drift causes a mis-match between the reference signal and the collected signal.

FIGS. 4A, 4B, 4C and 4D

Figure 4A:
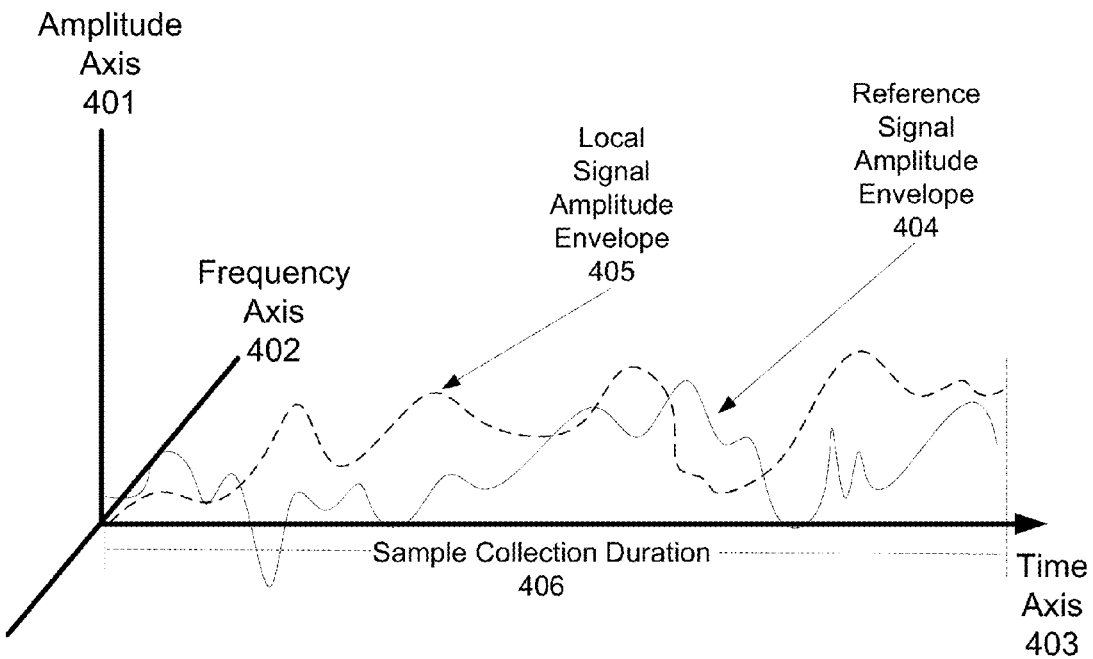
FIG. 4A depicts the reference and local signal envelopes versus time across a single frequency offset.

FIG. 4A shows a single time-slice 205 of the local and reference signal amplitudes over the sample collection duration.

Figure 4B:
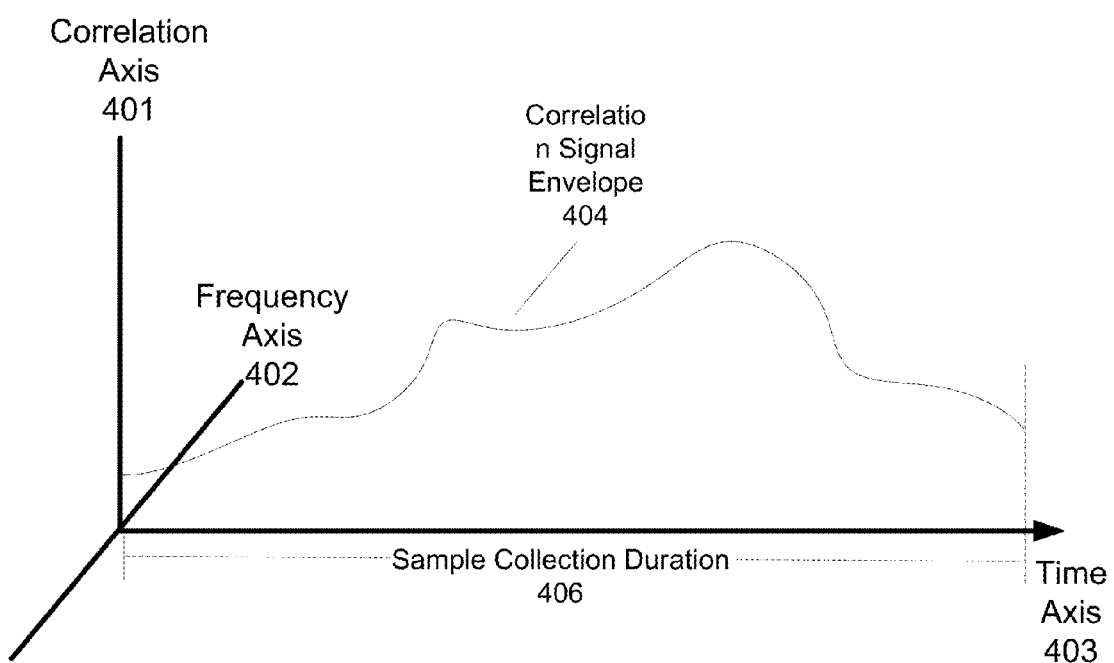
FIG. 4B depicts the correlation of the reference and local signals versus time across a single frequency offset.

FIG. 4B shows a single time-slice 205 of the correlated local and reference signals over the entire sample collection duration 406. Correlation of the local and reference signals over multiple frequency and time offsets are used to produce the frequency 402, time 403, and correlation 401 search space.

Figure 4C:
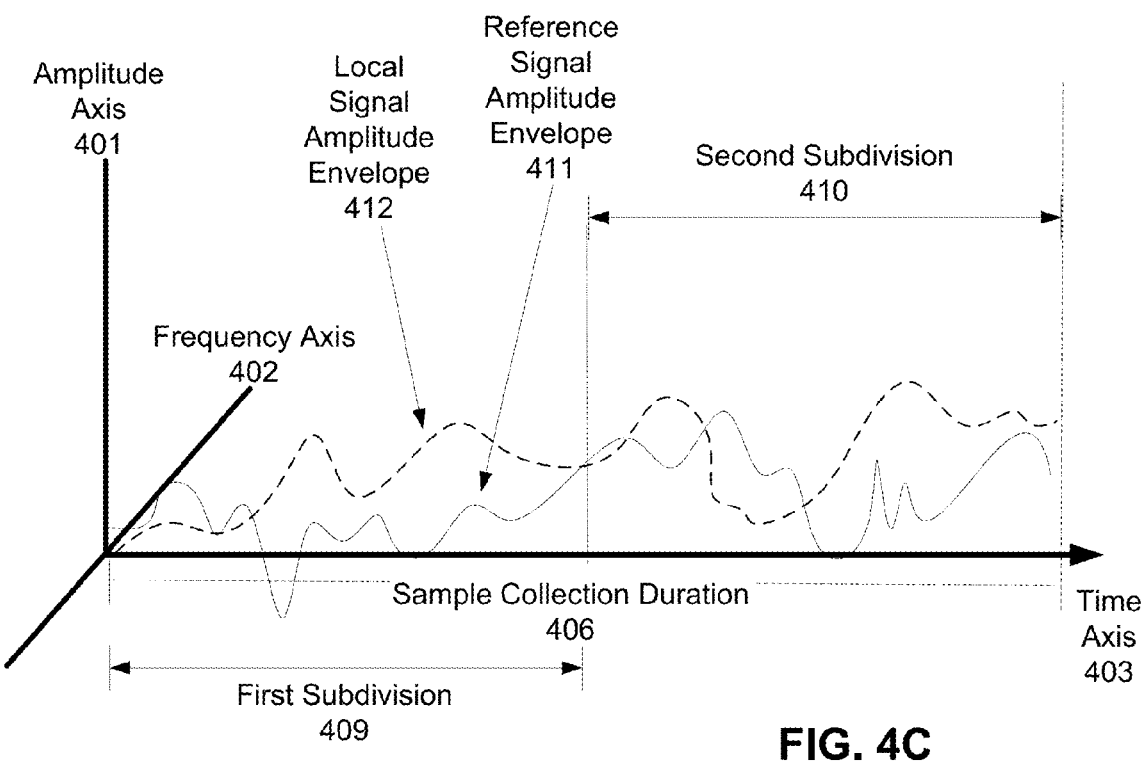
FIG. 4C shows the segmenting of the locally received signal and reference signals into successive, discrete subdivisions versus time at a single frequency offset.

FIG. 4C shows a single time-slice of the local and reference signals over the sample collection duration. In FIG. 4C, the local and reference signals have been segmented into successive, discrete subdivisions (409 and 410) spanning the entire sample collection duration 406.

Figure 4D:
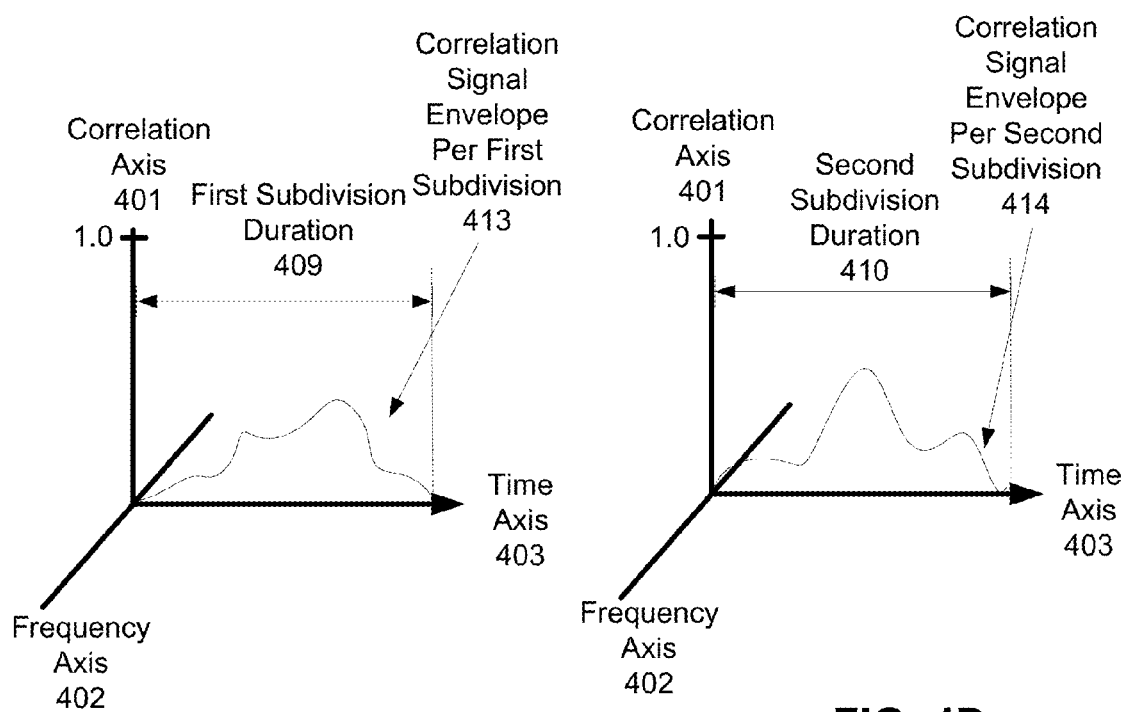
FIG. 4D shows the correlation of subdivision of the reference and local signals versus time across a single frequency offset into multiple correlation maps.

FIG. 4D shows a single frequency time slice of the multiple frequency 402, time 403, and correlation 401 search spaces (one per subdivision 409, 410). As FIG. 4D shows each subdivision now includes an independent correlation signal amplitude envelope within the newly created frequency 402, time 403, and correlation 401 search spaces.

FIG. 5

Figure 5:
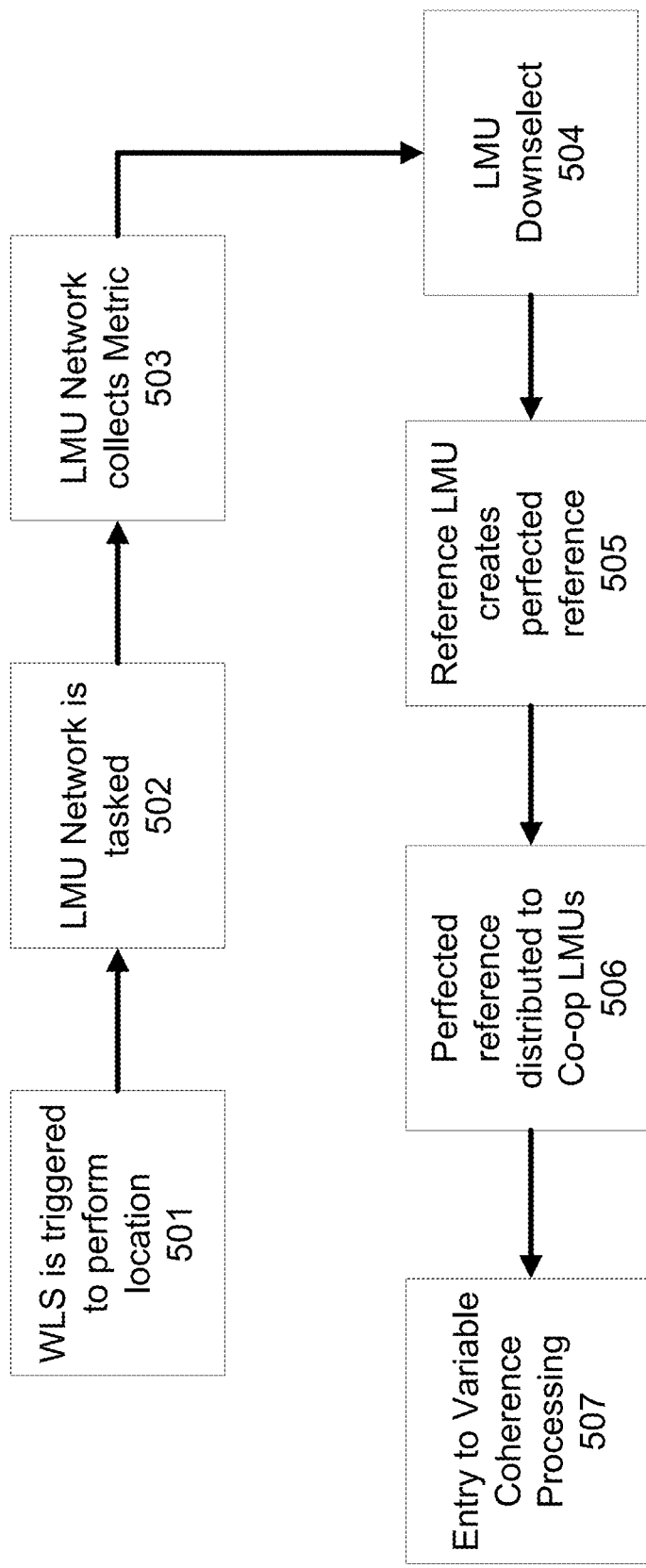
FIG. 5 shows the operational stages of the matched replica process prior to variable coherence processing.

FIG. 5 summarizes the processing steps used in matched replica, station-based processing. Examples of steps 501 to 507 are illustrated in U.S. Pat. No. 5,327,144, "Cellular Telephone Location System"; U.S. Pat. No. 5,608,410, "System for locating a source of Bursty transmissions cross reference to related applications"; U.S. Pat. No. 6,047,192, "Robust Efficient Localization System"; U.S. Pat. No. 6,483,460, "Baseline Selection Method for Use in a Wireless Location System"; and U.S. Pat. No. 6,661,379, "Antenna Selection Method for a Wireless Location System," all of which are incorporated by reference herein.

In step 501, the wireless location system (WLS) is triggered to perform a location. This trigger can be a message generated by the wireless communications network (WIN), internally by the wireless communication system or externally by a network monitoring application such as a Radio Network Monitor (RAM) or Link Monitoring System (LMS). The triggering event may be a single message, multiple exchanged messages, or series of messages containing the network and radio link parameters necessary for the SMLC to task the LMU network.

In step 502, the SMLC tasks the LMU network via the provisioned data links, the SMLC selected LMUs collect radio signal strength and quality information 503 for the LMU downselect in step 504 where only LMUs with favorable metrics are used in subsequent steps. Step 503 may also encompass a phase where the SMLC analyzes the LMU metrics and serving cell and sector to determine the optimal LMU cluster to minimize the Geometric Dilution of Precision for the location.

In step 505, the LMU with the best (as determined by the metric and analysis) radio signal is used to create a reference (also known as a replica) wherein the signal of interest is demodulated. The reference is then forwarded to all LMUs in the selected cluster in step 506.

At step 507, the variable coherence processing is begun.

Figure 6:
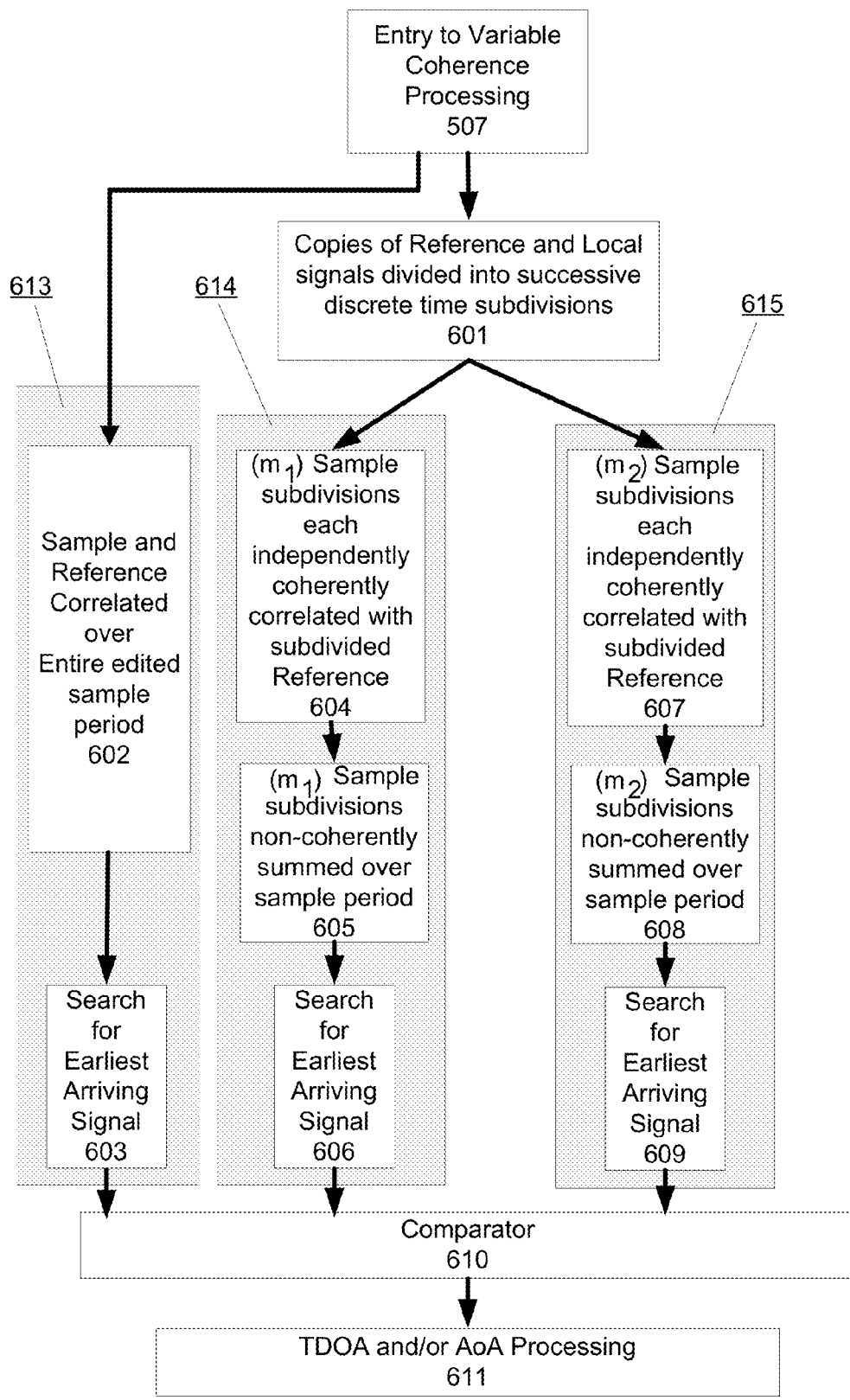
FIGS. 6 and 7 show different views of the operations of the variable coherence processing approach described herein.
Figure 7:
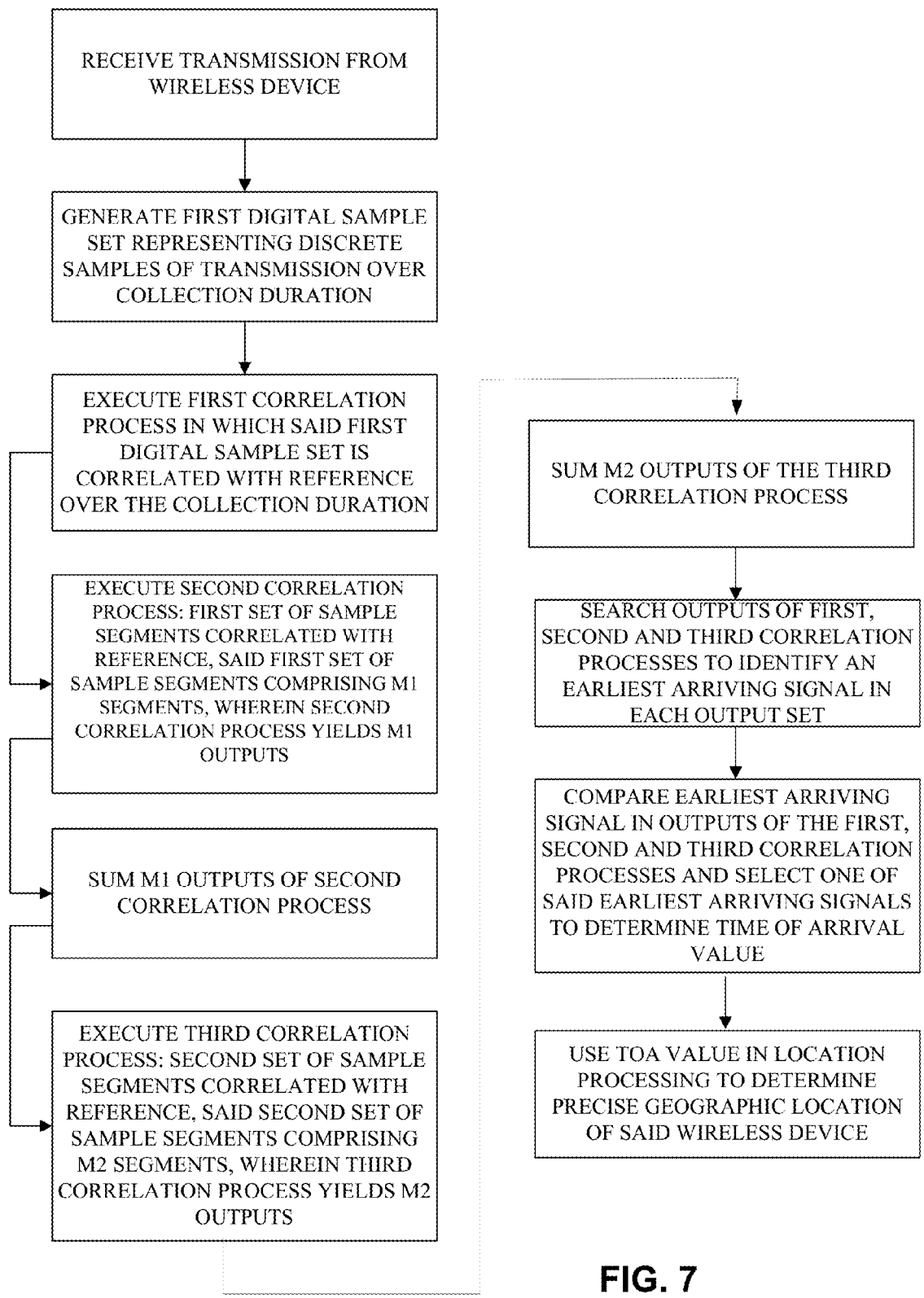

FIGS. 6 and 7

FIG. 6 is provided to illustrate the processing steps used in variable coherence processing of a weak signal for TOA, TDOA and AoA based location estimation.

Entry to variable coherence processing 507 starts with an evaluation of the duration of the sample collection period. If the collection period is below the threshold where test locations start to suffer from the effects of non-coherent signal processing, then variable coherence processing will not be performed. Pre-processing of the samples may occur at this stage, for example that taught in U.S. Pat. No. 6,765,531; "System and Method for Interference Cancellation in a Location Calculation for use in a Wireless Location System". Due to Doppler shift and mobile device timing source shifts, full coherence over the entire sample period is unlikely, as is the case where no coherence gain is available for any part of the sample (see FIG. 3 for an example of mobile timing shifts over the sample period). Therefore, the number of processing paths (Npaths) used can be varied from 1 to Mn, where Mn is the number of samples within the sample collection duration 406 (FIG. 4A).

When Npath=1, then the local and reference signals are not subdivided and are correlated over the entire sample collection duration over a preset range of time and frequency offsets 602. This correlation produces a single correlation amplitude, time and frequency search space for determination of the TDOA baseline between the reference and local receivers.

Using variable coherence, the correlation processing is split into a number of parallel (or serial if sufficient computational power is available) paths 601. In the FIG. 6 example, two partial coherence processing paths 614 and 615 are created by dividing copies of the local and reference signals into m1 and m2 successive, discrete subdivisions. The illustrative example shown in FIG. 6 then has three processing paths created for the cases of a full coherence 613 path, a first partial coherence path 614, and a second partial coherence 615 path.

By using the partial or variable coherence path(s) 614, 615, where the entire sample and reference periods are divided into successive, discrete subdivisions, coherence gain may be possible over each or any subdivision. To increase the odds of more subdivisions yielding the benefits of coherent gain, multiple processing paths 614, 615 each with a differing number successive, discrete subdivisions can be created.

The number of possible partial coherent paths is only constrained by the digitization of the software defined radio of the LMU (an exemplary LMU, formerly SCS, architecture is defined in TruePosition U.S. Pat. No. 6,266,013; "Architecture of a Signal Collection System for a Wireless Location System"). When a partial coherence processing path is created with M=N subdivisions where the number of subdivisions of the sampling period (M) is equal to the sampling rate of the LMU (N), then that processing path is deemed to be completely non-coherent. While N subdivisions is the limit of the resolution of the samples, the number of subdivisions and partial coherence paths need not equal N; rather the partial coherence processing scheme may be pre-set based on operational experience, or be dynamic based on the collection time duration since the likelihood of non-coherence increases with the collection time duration.

Once a processing path with (M) subdivisions has been created, each subdivision is correlated 604, 607 with the corresponding (in absolute time) reference signal subdivision multiple times over an arbitrary or constrained range of time delays and frequency offsets (as detailed in TruePosition U.S. Pat. No. 6,876,859; "Method for estimating TDOA and FDOA in a Wireless Location System," which is hereby incorporated by reference) until a search space of correlation amplitude over the frequency range and time period is produced for each subdivision.

For fully coherent or Npath=1 processing path 613 where coherence is assumed over the entire collection duration, the local signal is correlated repeatedly with the time and frequency shifted reference signal 602 across potential time-offsets (range) and frequency-offsets (Doppler and drift) to create a three dimensional search space of correlation amplitude, range, and Doppler/drift, as shown in FIG. 4A.

For each partial coherence processing path 614, 615, the first operation of the processing path 604, 607 is the creation of the three dimensional search space of correlation amplitude, range, and Doppler/drift (FIG. 4C) for each subdivision in each partial coherence processing path 614, 615. For each partial coherence processing path, the magnitude of the correlation amplitude is then summed 605 608. This summation of the subdivisions gives a processing gain of $10 \log(M)^{1/2}$ for each of the processing paths.

The total possible gain for the independent correlation of subdivisions created in the first stage 601 of the variable coherence operation and the summation of magnitude of individual subdivision correlations yields for each processing path with Npath>1 of gain is:

$$\text{Gain} = 10 \log(l) + 10 \log(M)^{1/2}$$

For each processing path 613 614 615, the wireless location system then attempts to determine the earliest arriving signal at the local receiver by searching 603, 606, 609 the generated correlation, time, and frequency maps (search space maps as shown in FIG. 2B). Examples of correlation searches include those in U.S. Pat. No. 6,876,859; "Method for estimating TDOA and FDOA in a Wireless Location System" and U.S. patent application Ser. No. 11/953,585; "Detection of Time of Arrival of CDMA Signals in a Wireless Communications System", both of which are owned by TruePosition.

The correlation result of the fully coherent path 613 is compared 610 with the correlation result of the first 614 and second 615 partial coherence processing path.

From the processing path showing the highest coherence, the correlation result of the received versus replica signal shows the time delay and frequency offset(s) experienced by the locally received signal in regards to the reference signal. These TDOA values are then used to perform a TDOA or TDOA/AoA location estimate 611 using, for example, the LSD algorithm introduced in U.S. Pat. No. 5,327,144, "Cellular Telephone Location System" or the hyperbolic baseline method introduced in U.S. Pat. No. 6,047,192 "Robust Efficient Localization System".

FIG. 7 depicts another view, i.e., a flowchart, of a variable coherence processing method as described above. As shown, the following steps are performed:

Receive a transmission from a wireless device.

Generate a first digital sample set representing discrete samples of the transmission over a collection duration.

Execute a first correlation process in which said first digital sample set is correlated with a reference over the collection duration.

Execute a second correlation process in which a first set of sample segments is correlated with said reference. The first set of sample segments comprises m1 segments, each of the m1 segments comprising a subset of said first digital sample set, wherein m1 is an integer greater than 1 and wherein the execution of said second correlation process yields m1 outputs.

Non-coherently sum the m1 outputs of the second correlation process.

Execute a third correlation process in which a second set of sample segments is correlated with said reference. The second set of sample segments comprises m2 segments, each of the m2 segments comprising a subset of said first digital sample set, wherein m2 is an integer greater than m1 and wherein the execution of said third correlation process yields m2 outputs.

Non-coherently sum the m2 outputs of the third correlation process.

Search outputs of the first, second and third correlation processes to identify an earliest arriving signal in each output set.

Compare the identified earliest arriving signal in the outputs of the first, second and third correlation processes and select one of said earliest arriving signals to determine a time of arrival (TOA) value for use in location processing.

Use the TOA value in location processing to determine a precise geographic location of said wireless device

FIG. 8

Figure 8:
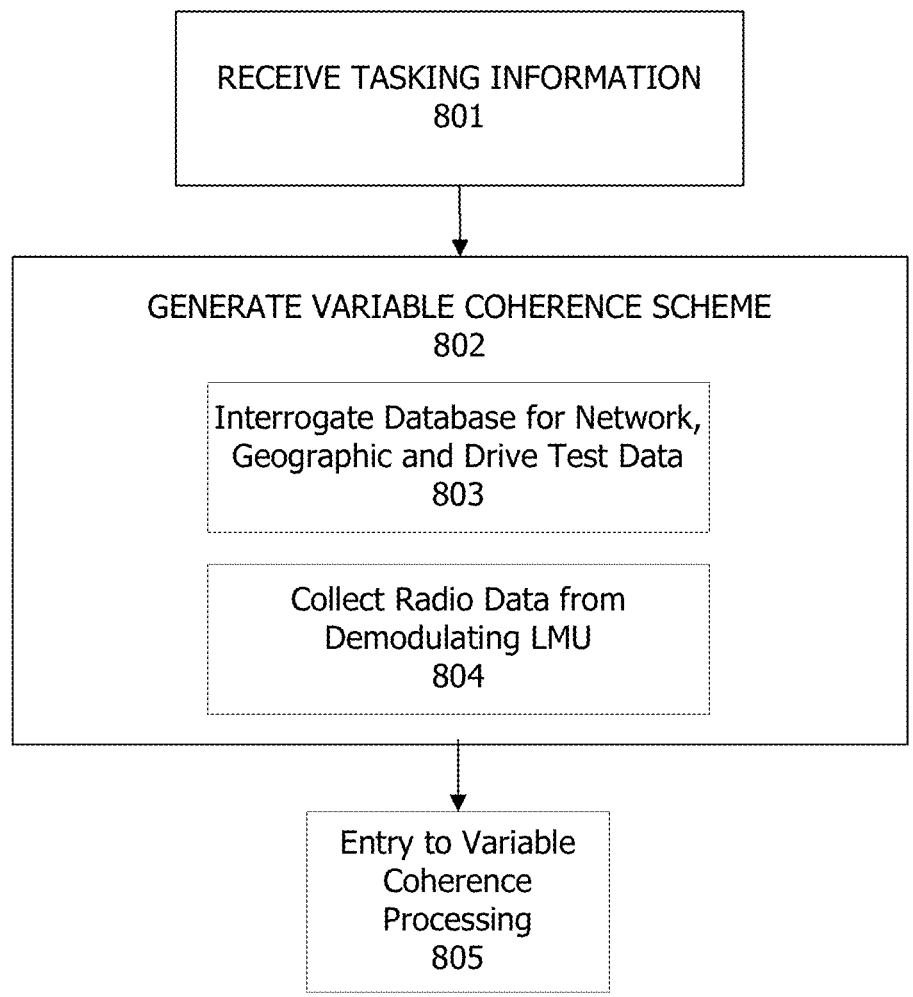
FIG. 8 depicts the dynamic selection of the processing paths and segmentation.

FIG. 8 depicts an entry stage for variable coherence processing. Once the WLS has been tasked for a location 801 either by the wireless communications network or by a probe system (as detailed, for example, in U.S. Pat. No. 6,782,264, "Monitoring of Call Information in a Wireless Location System," issued Aug. 24, 2004; U.S. Pat. No. 7,167,713, "Monitoring of call information in a wireless location system," issued Jan. 23, 2007; and U.S. Pat. No. 7,783,299 "Advanced triggers for location-based service applications in a wireless location system," issued Aug. 24, 2010), the WLS uses both historical and real-time information to determine a scheme 802 for variable coherence processing, selecting the number of paths and segmentation most likely to generate the highest gain.

The historical information 803 can include local cell density information, geographic data, propagation data and historical drive test data. The real-time signal data 804 can include the frequency band, received signal power, multi-path fading estimates (e.g. from a RAKE receiver), sounding channel information (e.g. from the 3GPP-LTE defined Sounding Reference Signal) and velocity information if available from multiple demodulation sites.

From the available information, a variable coherence scheme can be generated.

Default Scheme

One method for generation of a variable coherence scheme is the use of a default scheme that can be individually tailored to a service area using carrier network data and modeling prior to deployment. A service area may vary from as small as a single sector or cell to as large as wireless market area allowing considerable customization to fit the WLS deployment.

Default Value Dependent on Propagation Mapping/Modeling

Service areas will tend to have a distribution of UE velocities that combined with knowledge of the carrier's frequency bands will allow selection of a default set of maps/path. Since frequency shifts due to the Doppler Effect are a prime cause of incoherence, the smallest map based on the largest expected Doppler.

Default Scheme Dependent on Frequency Band

Each operational frequency band (e.g. cellular A/B, PCS, AWS) will have its own default set which can be adjusted. Typically, regardless of frequency band, the default set will always include the largest map (the totally coherent case) to handle the zero velocity, zero Doppler case.

Default Value Dependent on Cell Density

Wireless communications networks (WCN) are often built as overlay/underlay systems with large "macrocell" towers and smaller micro/pico cells. Cell density and cell type gives WLS planners a proxy to expected mobile velocity since 'fast movers' are typically assigned to the larger cells to limit handovers while stationary low speed mobile devices are moved to the micro/pico cell network to maximize WCN capacity.

Improving the Default Scheme

Use of collected data can be used to individually tailor a default scheme used in a service area prior to cut-over to general commercial use. If sufficient radio signal data and location data is collected, a set of default schemes for the WCN can be established without the modeling step. Drive test data can also be used to test and improve a modeled schema.

Drive Test Determined Default Schema

Default scheme dependent on cell/sector multipath and Doppler data. Making moving drive test calls at normal road speeds allow collection of data to create or adjust the default schema. For each cell and sector available from drive testing, a variable coherence scheme that gives a successful TDOA estimate that is associated with the calls' active set is developed.

Dynamic Improvement

Use of collected data from the operational system can be used continuously or periodically to adjust the default schema and better optimize the variable coherence processing. This type of 'learning system' will add or reduce the number of paths from default over time. For locations that have the same active set for demodulation over time the same paths (maps) will tend to be selected.

Dynamic Schema

Use of real-time radio signal data may be used to create or modify a schema on a per-location basis. Examples include:
 a. use the RAKE finger tracking to estimate whether the fading is fast or slow and select the maps/paths accordingly—smaller maps for fast fading and larger maps for slow fading. Scheme selection from the available set of paths for the TDOA solution is automatic with the map that has the highest ratio of its global peak to its detection threshold selected.
 b. Use the selected TDOA map from the reference LMU as a guide to select the maps/paths at the co-op LMUs. The co-op LMUs could compute the entire, set (so they are not waiting) but only select a subset of the computed maps for search based on the reference map.
 c. Processor loading may also be considered as real-time information in the decision on construction of the variable coherence scheme. In overload conditions, a small set of paths may be selected to allow greater location capacity at a lower average location accuracy and yield.

Once the variable coherence scheme is calculated (or applied if a default schema is used), the variable coherence processing stage can be entered 805.

CONCLUSION

The true scope the present invention is not limited to the presently preferred embodiments disclosed herein. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

What is claimed:

1. A method for generating a variable coherence scheme for use in a variable coherence integration process employing partial coherence processing paths to determine a precise time of arrival (TOA) of a transmission of a wireless device, comprising:
   prior to entering the variable coherence integration process and in response to receiving tasking information, using historical information and real-time information to generate a variable coherence processing scheme, including determining a number of partial coherence processing paths and discrete subdivisions most likely to generate a highest processing gain; and
   entering the variable coherence integration process.

2. A method as recited in claim 1, wherein the historical information includes local cell density information, geographic data, propagation data and historical drive test data.

3. A method as recited in claim 1, wherein the real-time information includes information determined from multiple demodulation sites, said real-time information including received signal power information, multi-path fading estimates, sounding channel information, and frequency offset information.

4. A method as recited in claim 3, wherein the frequency offset information is employed to calculate a velocity for the wireless device.

5. A method as recited in claim 1, wherein the real-time information includes frequency band information provided with the tasking information.

6. A method as recited in claim 3, wherein the multipath fading estimates are determined from a RAKE receiver.

7. A method as recited in claim 3, wherein the sounding channel information is determined from a Sounding Reference Signal.

8. A method as recited in claim 1, wherein the generation of a variable coherence processing scheme includes use of a default scheme and modifying the default scheme.

9. A method as recited in claim 8, wherein the default scheme is initially tailored to a service area and wherein modifying the default scheme includes using carrier network data to determine a largest expected Doppler shift.

10. A method as recited in claim 9, wherein a default scheme is prepared for each of a plurality of operational frequency bands.

11. A method as recited in claim 9, wherein the default scheme is dependent on cell density.

12. A method as recited in claim 11, wherein larger cells are assumed to be handling calls for faster moving mobile devices.

13. A method as recited in claim 8, wherein modifying the default scheme comprises use of collected radio signal and location data, and modeling, to tailor the default scheme.

14. A method as recited in claim 13, further comprising using drive test data to test and improve a modeled schema, wherein the default scheme is dependent on multipath and Doppler data, and moving drive test calls are made at normal road speeds to enable collection of data to create or adjust the default scheme.

15. A method as recited in claim 14, wherein, for each cell and sector available from drive testing, a variable coherence scheme that gives a successful time difference of arrival (TDOA) estimate is developed.

16. A method as recited in claim 6, wherein RAKE finger tracking is used to estimate whether fading is fast or slow and to select smaller maps for fast fading and larger maps for slow fading.

17. A method as recited in claim 16, wherein a selected time difference of arrival (TDOA) map from a reference location measuring unit (LMU) is used as a guide to select the maps/paths at co-op LMUs.

18. A method as recited in claim 17, wherein the co-op LMUs compute an entire set but only select a subset of the computed maps for search based on a reference map.

19. A method as recited in claim 3, wherein processor loading is considered as real-time information in the decision on construction of the variable coherence scheme, wherein a small set of paths is selected in overload conditions to allow greater location capacity at a lower average location accuracy and yield.

20. A method as recited in claim 1, wherein the variable coherence integration process comprises:
  receiving a transmission of a wireless device;
  generating a first digital sample set representing discrete samples of the transmission over a collection duration;
  providing to first and second partial coherence processing paths copies of a reference and copies of the first digital sample set, wherein the copies are divided into m1 and m2 discrete subdivisions, wherein m1 and m2 are integers greater than 1 and m2 is greater than m1;
  executing, in the first partial coherence processing path, a first correlation process in which a first set of sample segments is correlated with said reference, said first set of sample segments comprising a first plurality (m1) of segments, each of the m1 segments comprising a subset of said first digital sample set, wherein the execution of said first correlation process yields m1 outputs, wherein the m1 outputs comprise m1 complex numbers;
  non-coherently summing the m1 outputs of the first correlation process to produce a number representing the sum of the magnitudes of the m1 complex numbers;
  executing, in the second partial coherence processing path, a second correlation process in which a second set of sample segments is correlated with said reference, said second set of sample segments comprising a second plurality (m2) of segments, each of the m2 segments comprising a subset of said first digital sample set, wherein the execution of said second correlation process yields m2 outputs, wherein the m2 outputs comprise m2 complex numbers;
  non-coherently summing the m2 outputs of the second correlation process to produce a number representing the sum of the magnitudes of the m2 complex numbers;
  searching outputs of the correlation processes to identify a peak corresponding to an earliest arriving signal in each output set;
  selecting one of said earliest arriving signals to determine a TOA value for use in location processing, wherein the selecting is based on the peaks in the outputs of the correlation processes; and
  using the TOA value in location processing to determine a precise geographic location of said wireless device.

21. A method as recited in claim 20, wherein the variable coherence integration process further comprises executing, in a full coherence path, a third correlation process in which said first digital sample set is correlated with said reference over the collection duration.

22. A wireless location system (WLS), comprising:
  (a) a subsystem for generating a variable coherence scheme for use in a variable coherence integration process employing partial coherence processing paths to determine a precise time of arrival (TOA) of a transmission of a wireless device, wherein the subsystem is configured to perform the following computer-implemented steps:
    prior to entering the variable coherence integration process and in response to receiving tasking information, using historical information and real-time information to generate a variable coherence processing scheme, including determining a number of partial coherence processing paths and discrete subdivisions most likely to generate a highest processing gain; and
    entering the variable coherence integration process; and
  (b) a plurality of location measuring units (LMUs), wherein at least one LMU comprises means for carrying out the variable coherence integration process.

23. A WLS as recited in claim 22, wherein the at least one LMU further comprises:
  a receiver for receiving a transmission of a wireless device;
  means for generating a first digital sample set representing discrete samples of the transmission over a collection duration;
  means for providing copies of a reference and copies of the first digital sample set, wherein the copies are divided into m1 and m2 discrete subdivisions, wherein m1 and m2 are integers greater than 1 and m2 is greater than m1;
  a first partial coherence path including means for executing a first correlation process in which a first set of sample segments is correlated with said reference, said first set of sample segments comprising a first plurality (m1) of segments, each of the m1 segments comprising a subset of said first digital sample set, wherein the execution of said first correlation process yields m1 outputs, wherein the m1 outputs comprise m1 complex numbers;
  means for non-coherently summing the m1 outputs of the first correlation process to produce a number representing the sum of the magnitudes of the m1 complex numbers;
  a second partial coherence path including means for executing a second correlation process in which a second set of sample segments is correlated with said reference, said second set of sample segments comprising a second plurality (m2) of segments, each of the m2 segments comprising a subset of said first digital sample set, wherein the execution of said a second correlation process yields m2 outputs, wherein the m2 outputs comprise m2 complex numbers;
  means for non-coherently summing the m2 outputs of the second correlation process to produce a number representing the sum of the magnitudes of the m2 complex numbers;

means for searching outputs of the correlation processes to identify an earliest arriving signal in each output set; and means for comparing the identified earliest arriving signal in the outputs of the correlation processes and selecting one of said earliest arriving signals to determine a TOA value for use in location processing.

24. A WLS as recited in claim 22, wherein the historical information includes local cell density information, geographic data, propagation data and historical drive test data.

25. A WLS as recited in claim 22, wherein the real-time information includes information determined from multiple demodulation sites, said real-time information including received signal power information, multi-path fading estimates, sounding channel information, and frequency offset information.

26. A WLS as recited in claim 25, wherein the frequency offset information is employed to calculate a velocity for the wireless device.

27. A WLS as recited in claim 22, wherein the real-time information includes frequency band information provided with the tasking information.

28. A WLS as recited in claim 25, wherein the multipath fading estimates are determined from a RAKE receiver.

29. A WLS as recited in claim 25, wherein the sounding channel information is determined from a Sounding Reference Signal.

30. A WLS as recited in claim 22, wherein the generation of a variable coherence processing scheme includes use of a default scheme and modifying the default scheme.

31. A WLS as recited in claim 30, wherein the default scheme is initially tailored to a service area and wherein modifying the default scheme includes using carrier network data to determine a largest expected Doppler shift.

32. A WLS as recited in claim 31, wherein a default scheme is prepared for each of a plurality of operational frequency bands.

33. A WLS as recited in claim 31, wherein the default scheme is dependent on cell density.

34. A method as recited in claim 33, wherein larger cells are assumed to be handling calls for faster moving mobile devices.

35. A WLS as recited in claim 30, wherein modifying the default scheme comprises use of collected radio signal and location data, and modeling, to tailor the default scheme.

36. A WLS as recited in claim 35, further comprising using drive test data to test and improve a modeled schema, wherein the default scheme is dependent on multipath and Doppler data, and moving drive test calls are made at normal road speeds to enable collection of data to create or adjust the default scheme.

37. A WLS as recited in claim 36, wherein, for each cell and sector available from drive testing, a variable coherence scheme that gives a successful time difference of arrival (TDOA) estimate is developed.

38. A WLS as recited in claim 28, wherein RAKE finger tracking is used to estimate whether fading is fast or slow and to select smaller maps for fast fading and larger maps for slow fading.

39. A WLS as recited in claim 38, wherein a selected time difference of arrival (TDOA) map from a reference location measuring unit (LMU) is used as a guide to select the maps/paths at co-op LMUs.

40. A WLS as recited in claim 39, wherein the co-op LMUs compute an entire set but only select a subset of the computed maps for search based on a reference map.

41. A WLS as recited in claim 25, wherein processor loading is considered as real-time information in the decision on construction of the variable coherence scheme, wherein a small set of paths is selected in overload conditions to allow greater location capacity at a lower average location accuracy and yield.

42. A WLS as recited in claim 23, wherein the at least one LMU further comprises means for executing, in a full coherence path, a third correlation process in which said first digital sample set is correlated with said reference over the collection duration.

* * * * *